US012571945B2

(12) United States Patent
Ishii et al.

(10) Patent No.: US 12,571,945 B2
(45) Date of Patent: Mar. 10, 2026

(54) DIFFUSOR AND OPTICAL SYSTEM INCLUDING THE SAME

(71) Applicant: NALUX CO., LTD., Osaka (JP)

(72) Inventors: Kenta Ishii, Osaka (JP); Yosuke Sakohira, Osaka (JP)

(73) Assignee: NALUX CO., LTD., Osaka (JP)

( * ) Notice: Subject to any disclaimer, the term of this patent is extended or adjusted under 35 U.S.C. 154(b) by 460 days.

(21) Appl. No.: 18/134,801

(22) Filed: Apr. 14, 2023

(65) Prior Publication Data

US 2023/0251405 A1 Aug. 10, 2023

Related U.S. Application Data

(63) Continuation of application No. PCT/JP2021/040016, filed on Oct. 29, 2021.

(60) Provisional application No. 63/109,050, filed on Nov. 3, 2020.

(51) Int. Cl.
*G02B 5/02* (2006.01)

(52) U.S. Cl.
CPC ................................... *G02B 5/0215* (2013.01)

(58) Field of Classification Search
CPC ...................................................... G02B 5/0215
USPC .......................................................... 359/599
See application file for complete search history.

(56) References Cited

U.S. PATENT DOCUMENTS

| | | | |
|---|---|---|---|
| 6,352,359 B1 | 3/2002 | Shie et al. | |
| 2002/0145797 A1* | 10/2002 | Sales ..................... | G02B 3/0056 359/456 |
| 2008/0049165 A1 | 2/2008 | Min et al. | |
| 2015/0377450 A1 | 12/2015 | Suh et al. | |

(Continued)

FOREIGN PATENT DOCUMENTS

| | | |
|---|---|---|
| EP | 3 165 873 A1 | 5/2017 |
| EP | 3 282 293 A1 | 2/2018 |

(Continued)

OTHER PUBLICATIONS

International Search Report and Written Opinion dated Jan. 11, 2022 corresponding to International Patent Application No. PCT/JP2021/040016.

(Continued)

*Primary Examiner* — Bumsuk Won
*Assistant Examiner* — Mitchell T Oestreich
(74) *Attorney, Agent, or Firm* — SQUIRE PATTON BOGGS (US) LLP

(57) ABSTRACT

The diffusor has a microlens array including microlenses with the bases placed on a plane. Concerning a curved surface of each microlens, the following expressions are satisfied, where in a cross section perpendicular to the plane and containing a straight line passing through the projection point onto the plane of the vertex and maximizing a distance between two points of the straight line on the periphery of the base, coordinate along the straight line, coordinate of the curved surface of the microlens in the direction perpendicular to the plane, the maximum value of the first derivative of z' with respect to x', the absolute value of the second derivative of z' with respect to x' at x' coordinate of the projection point and the absolute value at x' coordinate of an end of the straight line are represented respectively by x', z', d, D0 and D.

$$D/D0 < 1$$

and $$d \geq 2$$

14 Claims, 24 Drawing Sheets

Y
Z

(56) References Cited

U.S. PATENT DOCUMENTS

| | | |
|---|---|---|
| 2017/0123218 A1 | 5/2017 | Stigwall et al. |
| 2018/0113240 A1 | 4/2018 | Watanabe et al. |
| 2020/0018827 A1 | 1/2020 | Yamamoto |
| 2020/0133012 A1 | 4/2020 | Sales |
| 2022/0238761 A1 | 7/2022 | Takeda et al. |

FOREIGN PATENT DOCUMENTS

| | | |
|---|---|---|
| EP | 3 581 844 A1 | 12/2019 |
| EP | 3 644 110 A1 | 4/2020 |
| EP | 3 965 173 A1 | 3/2022 |
| JP | 2002-523861 A | 7/2002 |
| JP | 2005-173029 A | 6/2005 |
| JP | 2008-052280 A | 3/2008 |
| JP | 2010-015186 A | 1/2010 |
| JP | 2013-025318 A | 2/2013 |
| JP | 2016-510130 A | 4/2016 |
| JP | 2017-097058 A | 6/2017 |
| JP | 2020-067664 A | 4/2020 |
| JP | 2021-002632 A | 1/2021 |
| WO | 00/10835 A1 | 3/2000 |
| WO | 2016/163125 A1 | 10/2016 |
| WO | 2018/146889 A1 | 8/2018 |
| WO | 2019/230758 A1 | 12/2019 |
| WO | 2022/168565 A1 | 8/2022 |

OTHER PUBLICATIONS

International Search Report and Written Opinion dated Mar. 15, 2022 corresponding to International Patent Application No. PCT/JP2022/001073.

International Search Report and Written Opinion dated Mar. 28, 2023 corresponding to International Patent Application No. PCT/JP2023/004144.

* cited by examiner

Y
Z

X  Y  Z

Y
X

Y
Z

Y
Z

X
Y
Z

Y
Z 2 mm

X  Y  Z 0.1 mm

Y
X

Y
Z

Y
Z

X    Y    Z

Y
↑
└──→ X 0.1 mm

Y
↑
└──→ Z 0.1 mm

LIGHT
SOURCE

LIGHT
SOURCE

10°

20°

$1/e^2$

1

DIFFUSOR AND OPTICAL SYSTEM INCLUDING THE SAME

CROSS REFERENCE TO RELATED APPLICATION

This is a Continuation of International Patent Application No. PCT/JP2021/040016 filed Oct. 29, 2021, which designates the U.S. and which claims priority from U.S. Provisional Patent Application No. 63/109,050, dated Nov. 3, 2020. The contents of these applications are hereby incorporated by reference.

TECHNICAL FIELD

The present invention relates to a diffusor and an optical system including the same.

BACKGROUND ART

There is a need for a diffusor capable of delivering a diffused light beam with a wide angle of diffusion, for example FWHM (Full Width Half Maximum) of 140 degrees or greater. Patent document 1 discloses a diffusor capable of delivering a diffused light beam with a relatively wide angle of diffusion. The FWHM is, however, 90 degrees, and a diffused light beam with a sufficiently wide angle of diffusion has not been realized. Patent document 2 discloses a diffusor provided with a microlens array capable of delivering a diffused light beam with FWHM. of 140 degrees. However, the contour of a cross section of each microlens of the diffusor described above is represented by a quadric function, and in view of Fresnel reflection luminous intensity cannot be made sufficiently great at a wide angle of diffusion. Further, in the optical system disclosed in Patent document 2, the microlens array is placed on the side of an illuminated surface of the diffusor, and each of the microlenses shades rays of light from other microlenses, which will reduce the efficiency.

As described above, a diffusor and an optical system including the diffusor capable of delivering at a high efficiency a diffused light beam with FWHM of 140 degrees or greater has not been developed. Accordingly, there is a need for a diffusor and an optical system including the diffusor capable of delivering at a high efficiency a diffused light beam with FWHM of 140 degrees or greater.

PRIOR ART DOCUMENT

Patent Document

Patent document 1: JP2008052280A

Patent document 2: JP2017097058A

The object of the present invention is to provide a diffusor and an optical system including the diffusor capable of delivering at a high efficiency a diffused light beam with FWHM of 140 degrees or greater.

SUMMARY OF INVENTION

A diffusor according to a first aspect of the present invention is provided with a microlens array including microlenses arranged in such a way that bases of the microlenses are placed on a plane. A curved surface of each microlens is continuous and smooth except at the boundary and in each microlens $$D/D0 < 1$$

and $$d \geq 2$$

are satisfied, where in a cross section that is perpendicular to the plane and that contains a straight line that is determined to pass through the projection point onto the plane of the vertex of the microlens and to maximize a distance between two points of intersection of the straight line and the periphery of the base of the microlens, coordinate along the straight line is represented by x', coordinate of the curved surface of the microlens in the direction perpendicular to the plane is represented by z', the maximum value of the first derivative of z' with respect to x' is represented by d, the absolute value of the second derivative of z' with respect to x' at x' coordinate of the projection point is represented by D0 and the absolute value at x' coordinate of an end of the straight line is represented by D.

The shape of the diffusor according to the present aspect is configured in such a way that luminous intensity is sufficiently great at a great angle of diffusion. Accordingly, by an optical system including a light source and the diffusor according to the present aspect a diffused light beam with FWHM of 140 degrees or greater can be realized.

A diffusor according to a first embodiment of the first aspect of the present invention is provided with a microlens array including plural microlenses arranged in such a way that bases of the microlenses are placed on the plane without any gap therebetween, each base having a congruent and quadrilateral or regular hexagonal shape. A curved surface of each microlens is continuous and smooth except at the boundary and in each microlens $$D/D0 < 1$$

and $$d \geq 2$$

are satisfied, where the projection point onto the plane of the vertex of the microlens agrees with the point of intersection of diagonals of the quadrilateral or regular hexagonal shape, in a cross section that is perpendicular to the plane and that contains the longest diagonal, coordinate along the diagonal is represented by x', coordinate of the curved surface of the microlens in the direction perpendicular to the plane is represented by z', the maximum value of the first derivative of z' with respect to x' is represented by d, the absolute value of the second derivative of z' with respect to x' at x' coordinate of the point of intersection is represented by D0 and that at x' coordinate of an end of the diagonal is represented by D.

In the present embodiment microlenses of the same shape are placed on the plane without any gap therebetween, and therefore a more preferable distribution of the diffused light beam can be obtained. The quadrilateral shape can be a rectangle, a rhombus or a parallelogram with four sides. The regular hexagonal shape can be replaced with a hexagonal shape having three sets of opposite sides that are parallel to each other.

In a diffusor according to a second embodiment of the first aspect of the present invention the curved surface is aspherical and axially symmetric around the axis that passes through the projection point and is perpendicular to the plane.

In each microlens the radius of a circle the center of which is located at the projection point and which is formed by a line of intersection between the curved surface and the base of the microlens is defined as a reference radius. It is preferable that the base of each microlens contains an area inside a circle the center of which is located at the projection point and the radius of which is 50% of the reference radius. It is more preferable that the base of each microlens contains an area inside a circle the center of which is located at the projection point and the radius of which is 70% of the reference radius. It is further more preferable that the base of each microlens contains an area inside a circle the center of which is located at the projection point and the radius of which is 80% of the reference radius.

In a diffusor according to a third embodiment of the first aspect of the present invention in each microlens $$D/D0<0.5$$

is satisfied.

A diffused light beam with FWHM of 150 degrees or greater can be realized by an optical system including a light source and the diffusor according to the present embodiment.

In a diffusor according to a fourth embodiment of the first aspect of the present invention in each microlens $$D/D0<0.3$$

is satisfied.

A diffused light beam with FWHM of 160 degrees or greater can be realized by an optical system including a light source and the diffusor according to the present embodiment.

In a diffusor according to a fifth embodiment of the first aspect of the present invention in each microlens $$d\geq2.5$$

is satisfied.

In a diffusor according to a sixth embodiment of the first aspect of the present invention in each microlens $$d\geq3$$

is satisfied.

In a diffusor according to a seventh embodiment of the first aspect of the present invention in each microlens $$1 < \frac{P}{2 \cdot R} < 5.7$$

is satisfied where a length of a diagonal passing through the center of the quadrilateral or regular hexagonal base is represented by P and a radius of curvature of the curved surface at the vertex is R.

According to the present embodiment undesired contacts between a mold and a tool used to machine the mold can be avoided and a sufficiently high optical performance of microlenses can be obtained.

In a diffusor according to an eighth embodiment of the first aspect of the present invention a surface on the side opposite from the surface provided with the microlenses is a convex surface and the absolute value of radius of curvature of the convex surface is 100 times as great as R or greater where the absolute value of radius of curvature of the curved surface at the vertex is represented by R.

When the absolute value of radius of curvature of the convex surface is an appropriate value that is 100 times as great as R or greater, the efficiency of an optical system can be increased.

An optical system according to a second aspect of the present invention includes any one of the above-described diffusors and a light source.

A diffused light beam with a sufficiently great angle of diffusion can be realized by the optical system according to the present aspect.

In an optical system according to a first embodiment of the second aspect of the present invention the microlens array is located in such a way that the microlens array faces the light source.

In the optical system according to the present embodiment each of the plural microlenses does not block rays of light delivered by other microlenses as in the case of an optical system in which a microlens array is located on the side opposite of the diffusor from the light source, and therefore the efficiency of the optical system is relatively high.

In an optical system according to a second embodiment of the second aspect of the present invention the light source emits a divergent light beam.

DESCRIPTION OF EMBODIMENTS

Figure 1:
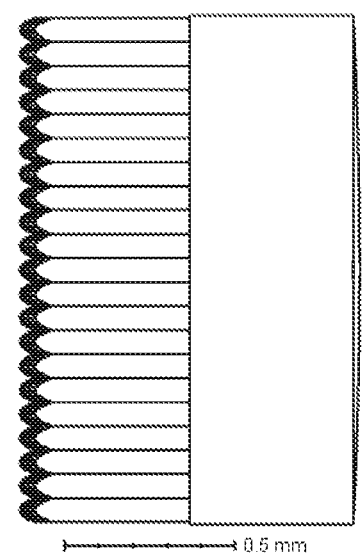
FIG. 1 is a side view (yz plane) of a diffusor of Example 1.

A diffusor according to the present invention is provided with a microlens array including plural microlenses, the bases of which are arranged on a plane. The curved surface of each microlens is continuous and smooth except at the boundary.

The diffusor according to the present invention is designed such that the microlens array is placed on the light source side of the diffusor. When the microlens array side of the diffusor is illuminated with a light beam, the light beam is diffused with a wide angle. If a diffusor is designed such that a microlens array is placed on the side of the diffusor farther from the light source, rays of light spread with wide angles are blocked by adjacent lenses, and power of the diffused light beam deteriorates.

In a cross section that is perpendicular to the plane and contains a straight line on the plane, the straight line being determined to pass through the projection point onto the plane of the vertex of a microlens and to maximize a distance between the two points of intersection of the straight line and the periphery of the base of the microlens, coordinate along the straight line is represented by x', coordinate of the curved surface of the microlens in the direction perpendicular to the plane is represented by z', the maximum value of the first derivative of z' with respect to x' is represented by d, the absolute value of the second derivative of z' with respect to x' at x' coordinate of the projection point is represented by D0 and that at x' coordinate of the boundary (each end of a diagonal) is represented by D. According to findings of the inventors, the angle of diffusion of the diffused light beam can be changed by changing a value of D/D0 in an optical system including a light source and the diffusor. The angle of diffusion can be defined by an angle between the central axis of the light beam and a ray of light the intensity of which is half of the intensity of the ray along the central axis. The double angle of the above-described angle formed with the central axis of the light beam is referred to as FWHM (Full Width Half Maximum) angle of diffusion. When D/D0<1 is satisfied in the case that d is 2 or greater, the FWHM angle of diffusion can be made greater than 140 degrees. When D/D0<0.5 is satisfied in the case that d is 2 or greater, the FWHM angle of diffusion can be made greater than 150 degrees. When D/D0<0.3 is satisfied in the case that d is 2 or greater, the FWHM angle of diffusion can be made greater than 160 degrees.

On the other hand, a diffusor including the microlens array described above is usually manufactured by an injection molding process using a mold. Considering optical performance of microlenses and formability of a mold, the relationship 1<P/(2R)<5.7 should preferably be satisfied, where the length of a diagonal passing through the center of a rectangle or a regular hexagon is represented by P and the radius of curvature at the vertex of the curved surface is represented by R. The lower limit of the above-described expression is determined by a specified focal length of a microlens, and the upper limit of the above-described expression is determined by a shape of the mold designed to prevent an undesired contact with a tool used to machine the mold.

The surface of the diffusor farther from the light source is a flat surface parallel to the base of each microlens or a convex surface with a relatively great radius of curvature. From the standpoint of efficiency of an optical system in which a light source and the diffusor are combined, the surface of the diffusor farther from the light source should preferably be a convex surface having an appropriate value of radius of curvature that is a hundred times as great as R or greater.

Examples of the present invention will be described below. Each example includes a light source and a diffusor provided with a microlens array.

In an optical system including a light source and a diffusor, the origin is located at the center of the light source surface, and an x-axis and a y-axis are defined in a plane parallel to the base of each microlens, and a z-axis is defined so as to be orthogonal to the x-axis and the y-axis. The direction of the z-axis is that of a ray of light travelling from the light source along the z-axis. The light source surface agrees with the xy plane and is orthogonal to the z-axis. The diffuser is placed such that the center (of the surface farther from the light source) of the diffusor is located on the z-axis.

By way of example, a light source is placed on the left side of the diffusor shown in FIG. 1. A light beam emitted by the light source travels in the direction of the z-axis, enters the microlens array, passes through the diffusor and exits from the surface farther from the light source on the right side of the diffusor as a diffused light beam.

For the curved surface of each microlens of the microlens array and the surface farther from the light source of the diffusor, the origin is located at the vertex of each lens, an x-axis and a y-axis are defined in a plane parallel to the base of each lens, and a z-axis is defined so as to be orthogonal to the x-axis and the y-axis. The direction of the z-axis is that of a ray of light travelling from the light source along the z-axis.

The curved surface of each microlens and the surface farther from the light source of the diffusor are expressed by the following expression.

$$z = \frac{cr^2}{1 + \sqrt{1 - (1+k)c^2 r^2}} + \sum A_i r^i \tag{1}$$

c represents curvature, that is, the inverse number of radius of curvature R. r represents distance between a point on the curved surface or the surface farther from the light source of the diffusor and the z-axis. k represents a conic constant, and Ai represents an aspherical coefficient of order i.

Example 1

FIG. 1 is a side view (yz plane) of a diffusor of Example 1.

Figure 2:
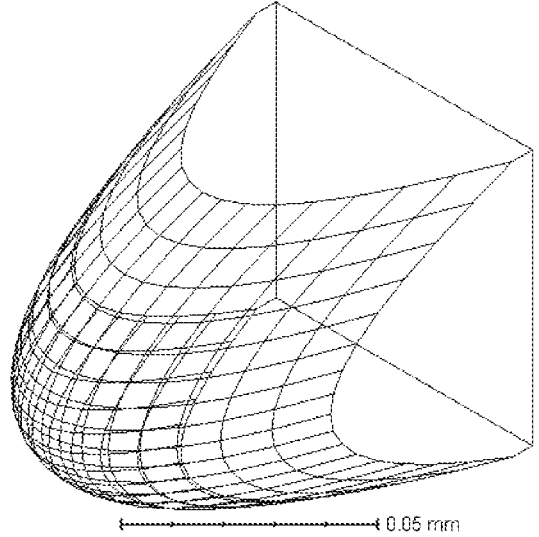
FIG. 2 is a perspective view of a microlens of the diffusor of Example 1.
Figure 2:

FIG. 2 is a perspective view of a microlens of the diffusor of Example 1.

Figure 3:
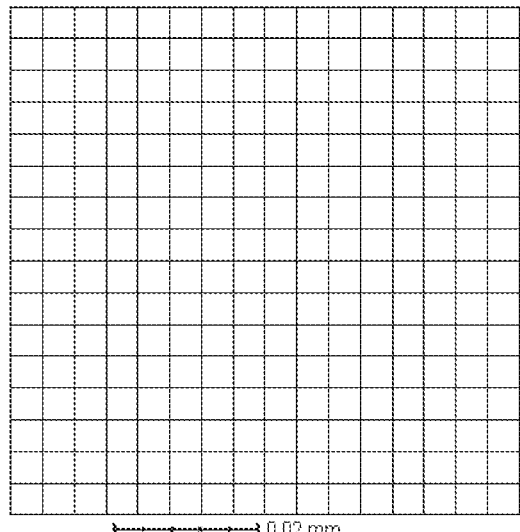
FIG. 3 is a plan view (xy plane) of a microlens of the diffusor of Example 1.

FIG. 3 is a plan view (xy plane) of a microlens of the diffusor of Example 1.

Figure 4:
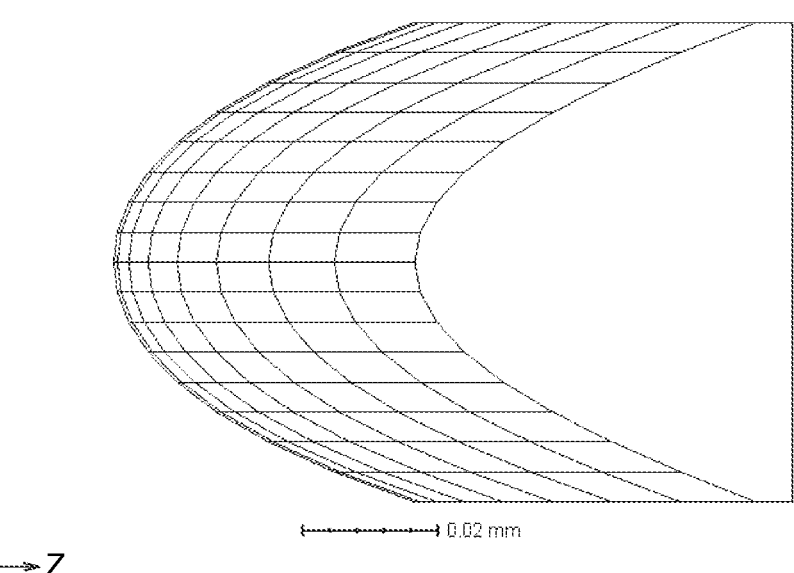
FIG. 4 is a side view (yz plane) of a microlens of the diffusor of Example 1.

FIG. 4 is a side view (yz plane) of a microlens of the diffusor of Example 1.

In the drawing a pattern on the curved surface of the microlens is provided such that the shape of the curved surface can easily be grasped.

The shape of the diffusor of Example 1 in a cross section parallel to an xy plane is a square each side of which is 1.48 millimeters long.

The base of each microlens of Example 1 is square, and square bases are arranged on an xy plane without any gap therebetween.

Figures 50, 51:
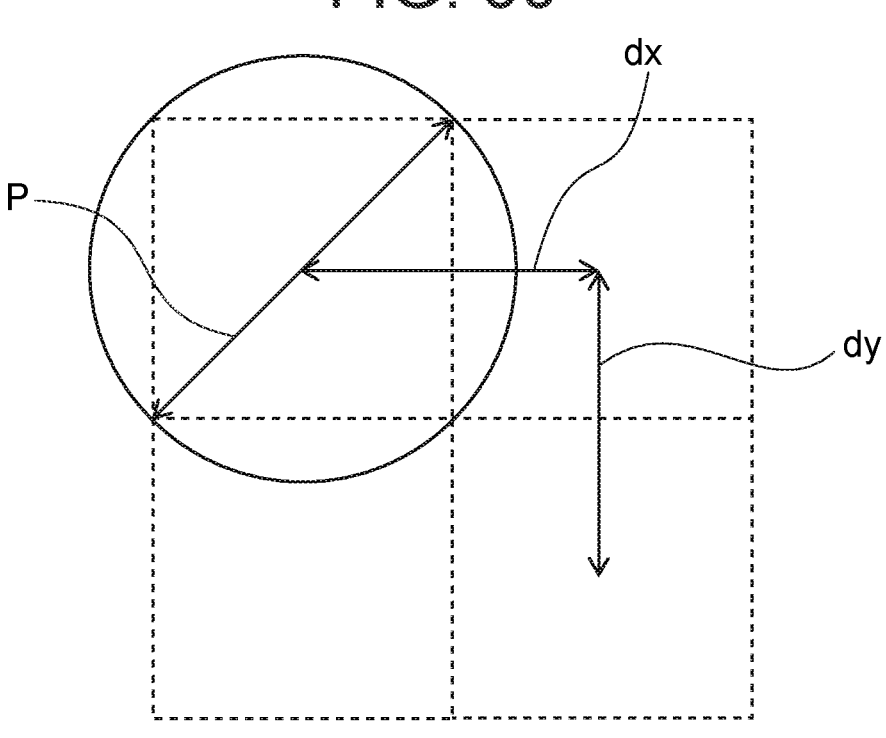
FIG. 50 shows an arrangement of square bases of microlenses of Example 1.
FIG. 51 shows an arrangement of rectangular bases of microlenses of Example 3.

FIG. 50 shows an arrangement of square bases of microlenses of Example 1. In FIG. 50, distance dx in the x-axis direction between the centers of squares which border each other on a side in the y-axis direction and distance dy in the y-axis direction between the centers of squares which border each other on a side in the x-axis direction are 0.07071 millimeters. The length P of a diagonal passing through the center of a square is 0.1 millimeters.

The numerical data of Expression (1) representing the curved surface of a microlens are as below.

R: 0.01795 mm
k: −0.963
A2: 0
A4: 5.077762E+03
A6: 1.907324E+06
A8: −1.770637E+09
A10: 2.732180E+11

From the data given above, the value of P/(2R) is 2.786.

A reference radius of a circle formed by a line of intersection between the curved surface and a plane containing the base of a microlens is 0.1/2=0.05 millimeters. The center of the circle is located at the point of intersection of the diagonals of the square of the base. Further, a circle the center of which is located at the point of intersection of the diagonals of the square of the base and which has a radius of 0.07071/2=0.03536 millimeters is contained within the base. Accordingly, an area of a circle that has a radius of 70.7% of the reference radius is contained in the base.

The surface farther from the light source of the diffusor is spherical, and the numerical data of Expression (1) representing the surface farther from the light source are as below. In the present and following examples, Rexit represents the radius of curvature of the surface farther from the light source, that is, the radius of the spherical surface.

Rexit: −15 mm
k: 0

The thickness of the diffusor, that is, the distance in the z-axis direction between the vertex of a microlens and the vertex of the surface farther from the light source is 1.0 millimeter.

The light source surface is square, and the size in the x-axis direction and that in the y-axis direction are 0.8 millimeters. The distance in the z-axis direction between the light source and the diffusor 1.0 millimeter. In the present example, the diffusor is illuminated with a light beam having the same sizes with those of the light source. Luminous intensity in the light beam is uniform. The power of the light source is 1 watt. The wavelength of light is 850 nanometers, and the refractive index of the diffusor at the above-described wavelength is 1.63852.

Figures 5, 6, 7:
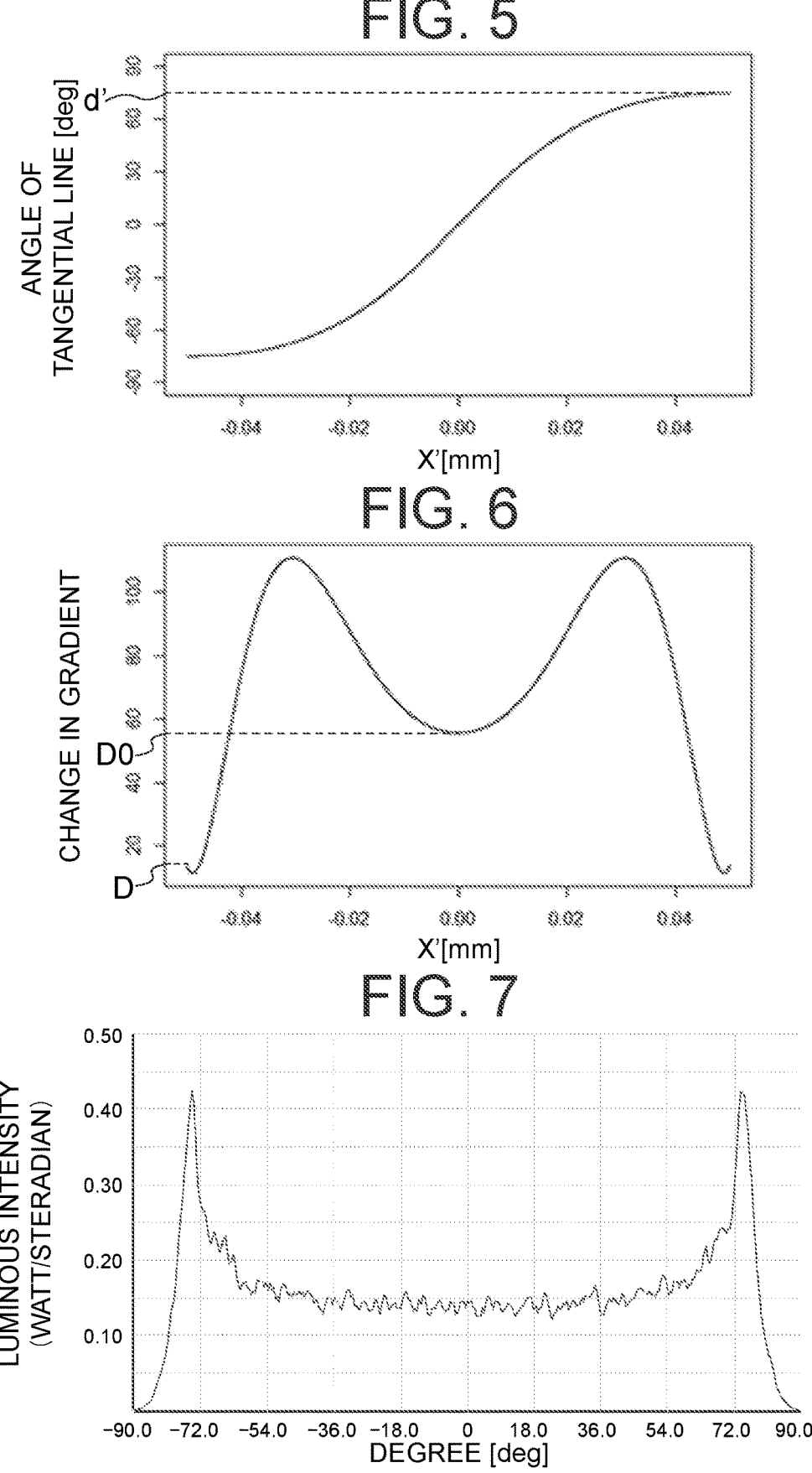
FIG. 5 shows the first derivative of z' with respect to x', where in a cross section which is perpendicular to the base and contains a diagonal of the square of the base of a microlens, the diagonal passing through the center of the square, coordinate along the diagonal is represented by x' and coordinate of the curved surface of the microlens in the direction perpendicular to the base is represented by z'.
FIG. 6 shows the second derivative of z' with respect to x', where in a cross section which contains a diagonal of the square of the base of a microlens, the diagonal passing through the center of the square, and which is perpendicular to the base, coordinate along the diagonal is represented by x' and coordinate of the curved surface of the microlens in the direction perpendicular to the base is represented by z'.
FIG. 7 shows a distribution of luminous intensity of a light beam diffused by the diffusor.

FIG. 5 shows the first derivative of z' with respect to x', where in a cross section which is perpendicular to the base and contains a diagonal of the square of the base of a microlens, the diagonal passing through the center of the square, coordinate along the diagonal is represented by x' and coordinate of the curved surface of the microlens in the direction perpendicular to the base is represented by z'. The horizontal axis of FIG. 5 indicates coordinate x' along the diagonal. The coordinate of the center of the square is 0, and the unit of length is millimeter. The vertical axis of FIG. 5 indicates angle of tangential line corresponding to the first derivative of z' with respect to x'. The angle of tangential line is an angle (acute angle) of the tangential line on the curved line representing the above-described curved surface with respect to the x'-axis direction in the above-described cross section. Angles measured in the clockwise direction are represented as positive, and angles measured in the counterclockwise direction are represented as negative. The maximum value of the first derivative of z' with respect to x' is 3.686, and the value corresponds to 74.8 degrees in the vertical axis of FIG. 5.

FIG. 6 shows the second derivative of z' with respect to x', where in a cross section which is perpendicular to the base and contains a diagonal of the square of the base of a microlens, the diagonal passing through the center of the square, coordinate along the diagonal is represented by x' and coordinate of the curved surface of the microlens in the direction perpendicular to the base is represented by z'. The horizontal axis of FIG. 6 indicates coordinate x' along the diagonal. The coordinate of the center of the square is 0, and the unit of length is millimeter. The vertical axis of FIG. 6 indicates the absolute value of the second derivative of z' with respect to x'. When the absolute value of the second derivative of z' with respect to x' at the x' coordinate of the center of the square is represented by D0, and that at the x' coordinate of the end of the diagonal of the square is represented by D, D0 is 55.719, D is 13.914 and D/D0 is 0.250.

A straight line which is parallel to the diagonal defining coordinate x' and which intersects with the z-axis of the optical system is referred to as the x'-axis of the optical system.

FIG. 7 shows a distribution of luminous intensity of a light beam diffused by the diffusor. The horizontal axis of FIG. 7 indicates angle of a ray of light with respect to the z-axis in a cross section containing the x'-axis and z-axis of the optical system. The unit of angle is degree. The vertical axis of FIG. 7 indicates luminous intensity of a ray of light in the cross section containing the x'-axis and z-axis of the optical system. The unit of luminous intensity is watt/steradian.

The efficiency of the optical system including the light source and the diffusor is 73.2%. In the present and following examples, the efficiency of the optical system is the ratio of the power of diffused light beam and the power of the light source (1 w).

Example 2

Figure 8:
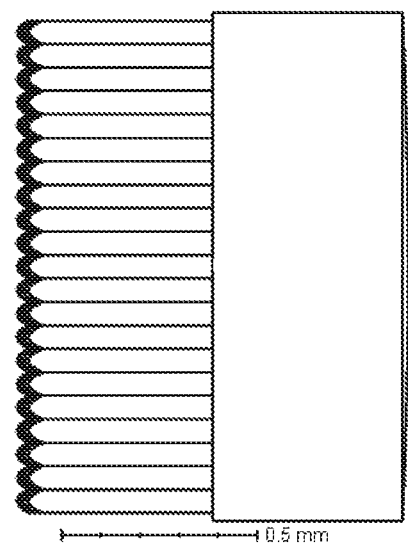
FIG. 8 is a side view (yz plane) of a diffusor of Example 2.

FIG. 8 is a side view (yz plane) of a diffusor of Example 2.

Figure 9:
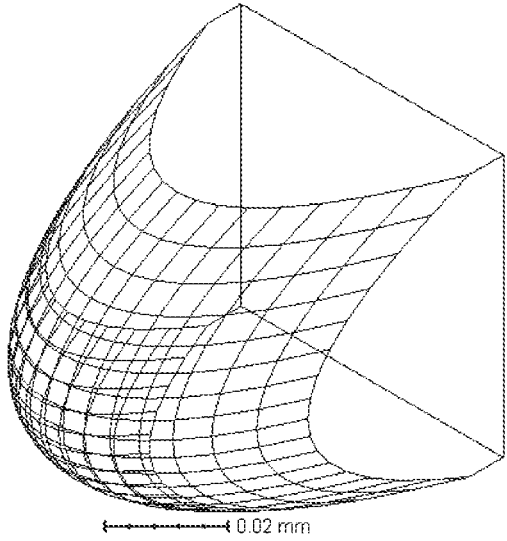
FIG. 9 is a perspective view of a microlens of the diffusor of Example 2.
Figure 9:

FIG. 9 is a perspective view of a microlens of the diffusor of Example 2.

Figure 10:
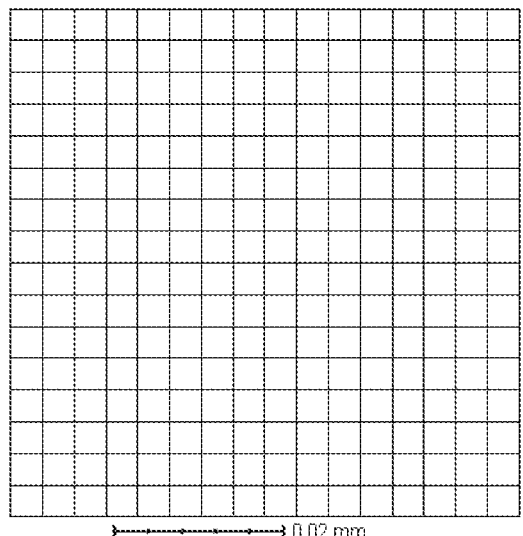
FIG. 10 is a plan view (xy plane) of a microlens of the diffusor of Example 2.
Figure 10:
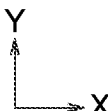

FIG. 10 is a plan view (xy plane) of a microlens of the diffusor of Example 2.

Figure 11:
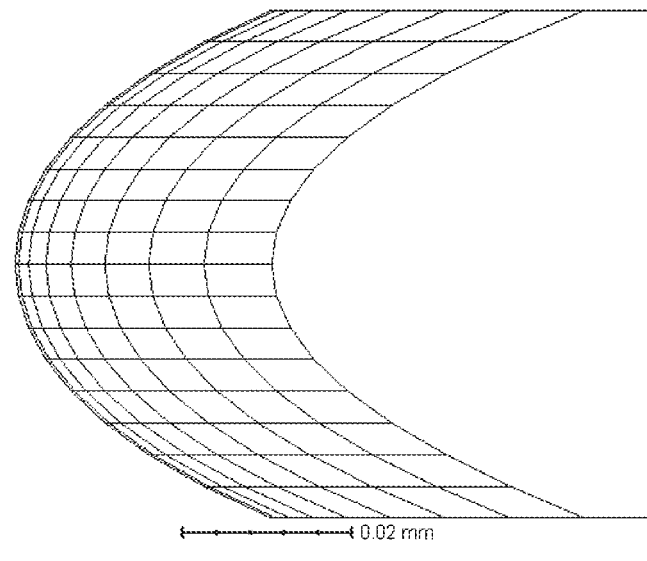
FIG. 11 is a side view (yz plane) of a microlens of the diffusor of Example 2.

FIG. 11 is a side view (yz plane) of a microlens of the diffusor of Example 2.

The shape of the diffusor of Example 2 in a cross section parallel to an xy plane is a square each side of which is 1.26 millimeters long.

The base of each microlens of Example 2 is square, and square bases are arranged on an xy plane without any gap therebetween.

FIG. 50 shows an arrangement of square bases of microlenses of Example 2. In FIG. 50, distance dx in the x-axis direction between the centers of squares which border each other on a side in the y-axis direction and distance dy in the y-axis direction between the centers of squares which border each other on a side in the x-axis direction are 0.06 millimeters. The length P of a diagonal passing through the center of a square is 0.08485 millimeters.

The numerical data of Expression (1) representing the curved surface of a microlens are as below.

R: 0.01795 mm
k: −0.963
A2: 0
A4: 5.077762E+03
A6: 1.907324E+06
A8: −1.770637E+09
A10: 2.732180E+11

From the data given above, the value of P/(2R) is 2.364.

The surface farther from the light source of the diffusor is spherical, and the numerical data of Expression (1) representing the surface farther from the light source are as below.

Rexit: −15 mm
k: 0

The thickness of the diffusor, that is, the distance in the z-axis direction between the vertex of a microlens and the vertex of the surface farther from the light source is 1.0 millimeter.

The light source surface is square, and the size in the x-axis direction and that in the y-axis direction are 0.8 millimeters. The distance in the z-axis direction between the light source and the diffusor 1.0 millimeter. In the present example, the diffusor is illuminated with a light beam having the same sizes with those of the light source. Luminous intensity in the light beam is uniform. The power of the light source is 1 watt. The wavelength of light is 850 nanometers, and the refractive index of the diffusor at the above-described wavelength is 1.63852.

Figures 12, 13, 14:
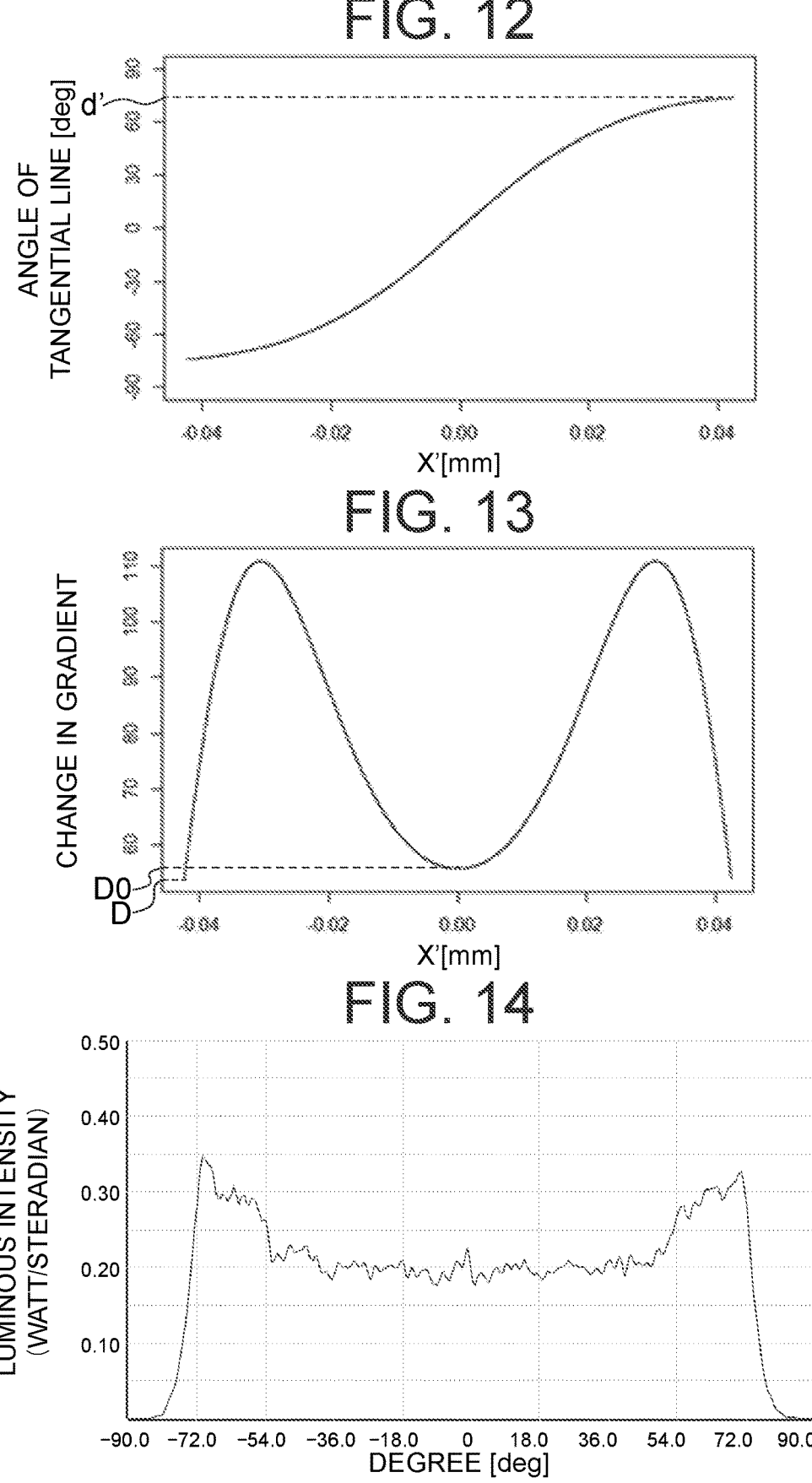
FIG. 12 shows the first derivative of z' with respect to x', where in a cross section which is perpendicular to the base and contains a diagonal of the square of the base of a microlens, the diagonal passing through the center of the square, coordinate along the diagonal is represented by x' and coordinate of the curved surface of the microlens in the direction perpendicular to the base is represented by z'.
FIG. 13 shows the second derivative of z' with respect to x', where in a cross section which contains a diagonal of the square of the base of a microlens, the diagonal passing through the center of the square, and which is perpendicular to the base, coordinate along the diagonal is represented by x' and coordinate of the curved surface of the microlens in the direction perpendicular to the base is represented by z'.
FIG. 14 shows a distribution of luminous intensity of a light beam diffused by the diffusor.

FIG. 12 shows the first derivative of z' with respect to x', where in a cross section which is perpendicular to the base and contains a diagonal of the square of the base of a microlens, the diagonal passing through the center of the square, coordinate along the diagonal is represented by x' and coordinate of the curved surface of the microlens in the direction perpendicular to the base is represented by z'. The horizontal axis of FIG. 12 indicates coordinate x' along the diagonal. The coordinate of the center of the square is 0, and the unit of length is millimeter. The vertical axis of FIG. 12 indicates angle of tangential line corresponding to the first derivative of z' with respect to x'. The angle of tangential line is an angle (acute angle) of the tangential line on the curved line representing the above-described curved surface with respect to the x'-axis direction in the above-described cross section. Angles measured in the clockwise direction are represented as positive, and angles measured in the counterclockwise direction are represented as negative. The maximum value of the first derivative of z' with respect to x' is 3.491, and the value corresponds to 74.0 degrees in the vertical axis of FIG. 12.

FIG. 13 shows the second derivative of z' with respect to x', where in a cross section which is perpendicular to the base and contains a diagonal of the square of the base of a microlens, the diagonal passing through the center of the square, coordinate along the diagonal is represented by x' and coordinate of the curved surface of the microlens in the direction perpendicular to the base is represented by z'. The horizontal axis of FIG. 13 indicates coordinate x' along the diagonal. The coordinate of the center of the square is 0, and the unit of length is millimeter. The vertical axis of FIG. 13 indicates the absolute value of the second derivative of z' with respect to x'. When the absolute value of the second derivative of z' with respect to x' at the x' coordinate of the center of the square is represented by D0, and that at the x' coordinate of the end of the diagonal of the square is represented by D, D0 is 55.719, D is 53.879 and D/D0 is 0.967.

A straight line which is parallel to the diagonal defining coordinate x' and which intersects with the z-axis of the optical system is referred to as the x'-axis of the optical system.

FIG. 14 shows a distribution of luminous intensity of a light beam diffused by the diffusor. The horizontal axis of FIG. 14 indicates angle of a ray of light with respect to the z-axis in a cross section containing the x'-axis and z-axis of the optical system. The unit of angle is degree. The vertical axis of FIG. 14 indicates luminous intensity of a ray of light in the cross section containing the x'-axis and z-axis of the optical system. The unit of luminous intensity is watt/steradian.

The efficiency of the optical system including the light source and the diffusor is 78.8%.

Example 3

Figure 15:
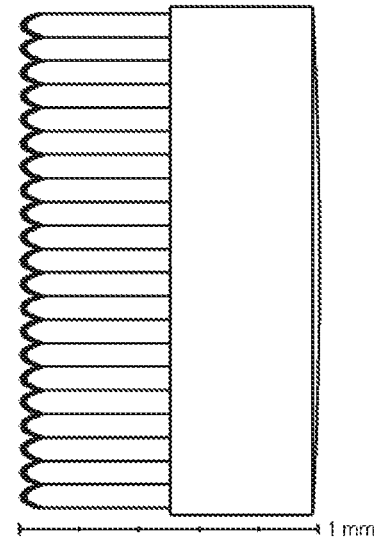
FIG. 15 is a side view (yz plane) of a diffusor of Example 3.
Figure 15:
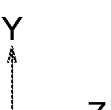

FIG. 15 is a side view (yz plane) of a diffusor of Example 3.

Figure 16:
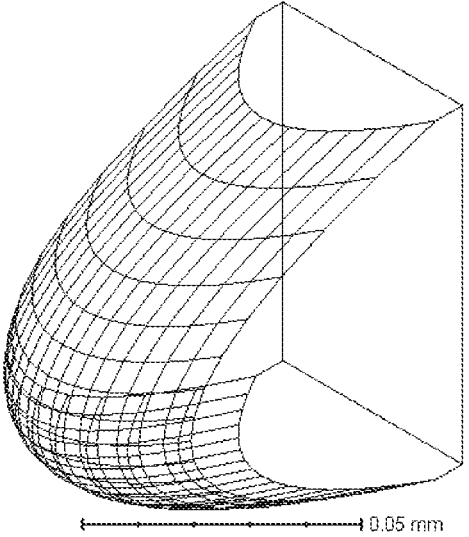
FIG. 16 is a perspective view of a microlens of the diffusor of Example 3.
Figure 16:
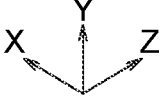

FIG. 16 is a perspective view of a microlens of the diffusor of Example 3.

Figure 17:
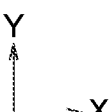
FIG. 17 is a plan view (xy plane) of a microlens of the diffusor of Example 3.
Figure 17:
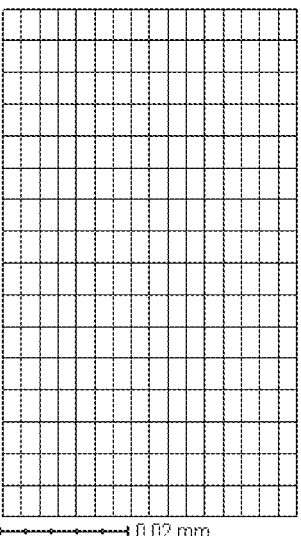

FIG. 17 is a plan view (xy plane) of a microlens of the diffusor of Example 3.

Figure 18:
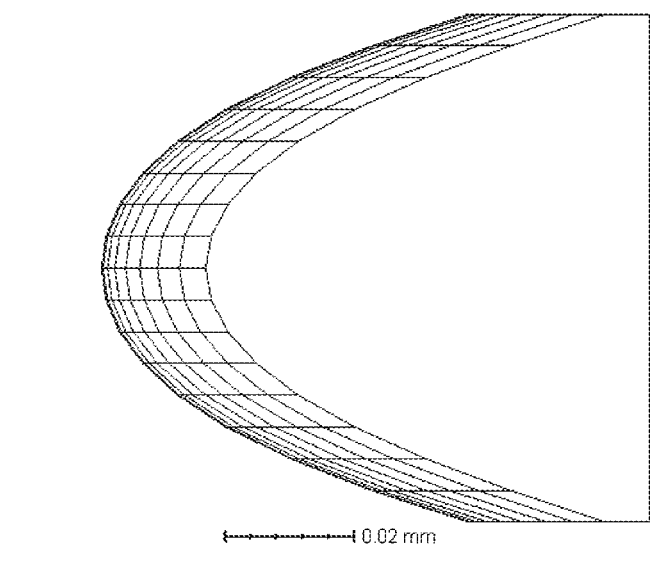
FIG. 18 is a side view (yz plane) of a microlens of the diffusor of Example 3.

FIG. 18 is a side view (yz plane) of a microlens of the diffusor of Example 3.

The shape of the diffusor of Example 3 in a cross section parallel to an xy plane is a square each side of which is 1.65 millimeters long.

The base of each microlens of Example 3 is rectangular, and rectangular bases are arranged on an xy plane without any gap therebetween.

FIG. 51 shows an arrangement of rectangular bases of microlenses of Example 3. In FIG. 51, distance dx in the x-axis direction between the centers of rectangles which border each other on a side in the y-axis direction is 0.0455 millimeters, and distance dy in the y-axis direction between the centers of rectangles which border each other on a side in the x-axis direction are 0.0788 millimeters. The length P of a diagonal passing through the center of the rectangle is 0.091 millimeters.

The numerical data of Expression (1) representing the curved surface of a microlens are as below.

R: 0.01795 mm
k: −0.963
A2: 0
A4: 5.077762E+03
A6: 1.907324E+06
A8: −1.770637E+09
A10: 2.732180E+11

From the data given above, the value of P/(2R) is 2.535.

A reference radius of a circle formed by a line of intersection between the curved surface and the base of a microlens is 0.091/2=0.0455 millimeters. The center of the circle is located at the point of intersection of the diagonals of the square of the base. Further, a circle the center of which is located at the point of intersection of the diagonals of the rectangle of the base and which has a radius of 0.0455/2=0.02275 millimeters is contained within the base. Accordingly, an area of a circle that has a radius of 50% of the reference radius is contained in the base.

The surface farther from the light source of the diffusor is spherical, and the numerical data of Expression (1) representing the surface farther from the light source are as below.

Rexit: −15 mm k: 0

The thickness of the diffusor, that is, the distance in the z-axis direction between the vertex of a microlens and the vertex of the surface farther from the light source is 1.0 millimeter.

The light source surface is square, and the size in the x-axis direction and that in the y-axis direction are 0.8 millimeters. The distance in the z-axis direction between the light source and the diffusor 1.0 millimeter. In the present example, the diffusor is illuminated with a light beam having the same sizes with those of the light source.

Luminous intensity in the light beam is uniform. The power of the light source is 1 watt. The wavelength of light is 850 nanometers, and the refractive index of the diffusor at the above-described wavelength is 1.63852.

Figures 19, 20, 21:
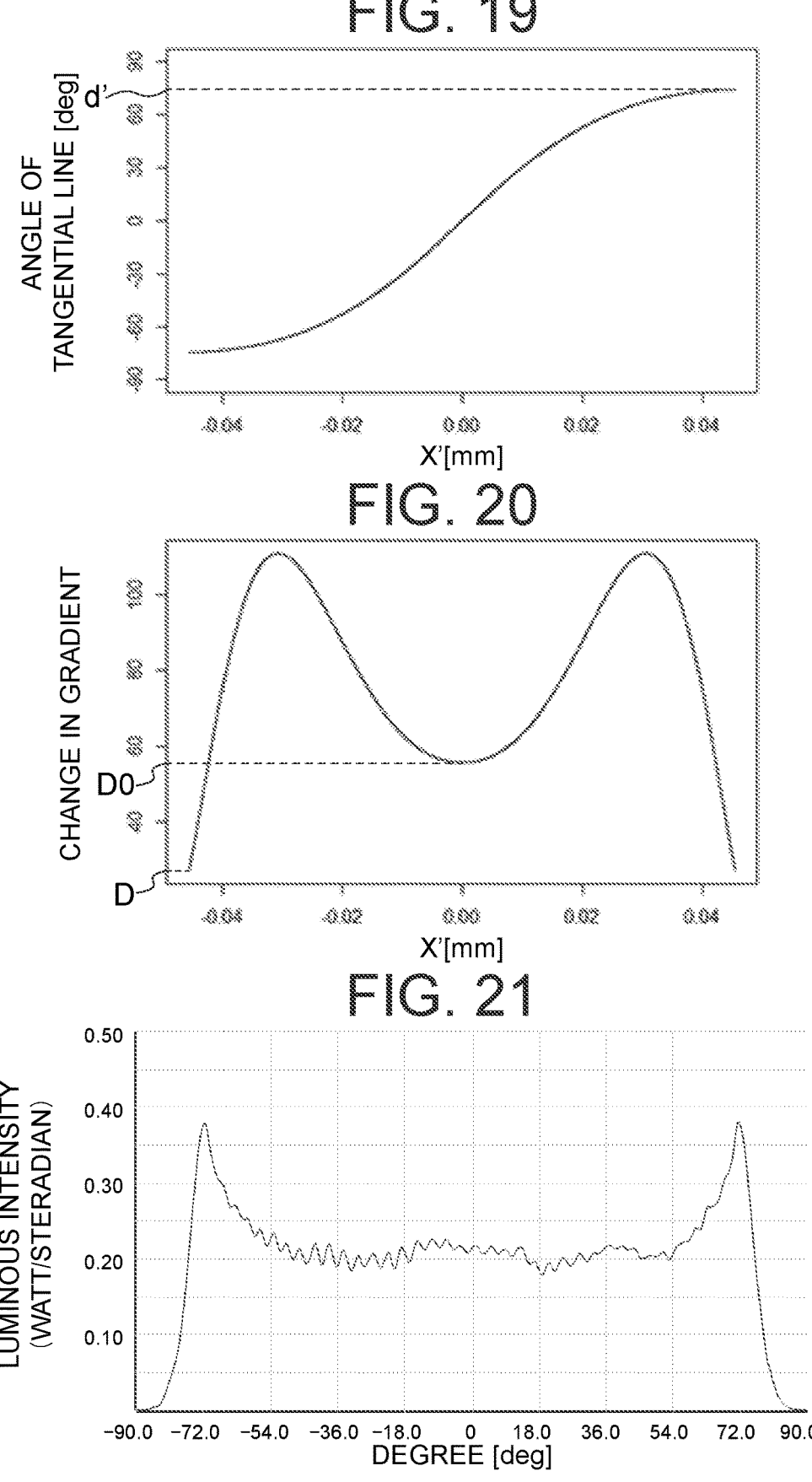
FIG. 19 shows the first derivative of z' with respect to x', where in a cross section which is perpendicular to the base and contains a diagonal of the rectangle of the base of a microlens, the diagonal passing through the center of the rectangle, coordinate along the diagonal is represented by x' and coordinate of the curved surface of the microlens in the direction perpendicular to the base is represented by z'.
FIG. 20 shows the second derivative of z' with respect to x', where in a cross section which contains a diagonal of the rectangle of the base of a microlens, the diagonal passing through the center of the rectangle, and which is perpendicular to the base, coordinate along the diagonal is represented by x' and coordinate of the curved surface of the microlens in the direction perpendicular to the base is represented by z'.
FIG. 21 shows a distribution of luminous intensity of a light beam diffused by the diffusor.

FIG. 19 shows the first derivative of z' with respect to x', where in a cross section which is perpendicular to the base and contains a diagonal of the rectangle of the base of a microlens, the diagonal passing through the center of the rectangle, coordinate along the diagonal is represented by x' and coordinate of the curved surface of the microlens in the direction perpendicular to the base is represented by z'. The horizontal axis of FIG. 19 indicates coordinate x' along the diagonal. The coordinate of the center of the rectangle is 0, and the unit of length is millimeter. The vertical axis of FIG. 19 indicates angle of tangential line corresponding to the first derivative of z' with respect to x'. The angle of tangential line is an angle (acute angle) of the tangential line on the curved line representing the above-described curved surface with respect to the x'-axis direction in the above-described cross section. Angles measured in the clockwise direction are represented as positive, and angles measured in the counterclockwise direction are represented as negative. The maximum value of the first derivative of z' with respect to x' is 3.615, and the value corresponds to 74.5 degrees in the vertical axis of FIG. 19.

FIG. 20 shows the second derivative of z' with respect to x', where in a cross section which contains a diagonal of the rectangle of the base of a microlens, the diagonal passing through the center of the rectangle, and which is perpendicular to the base, coordinate along the diagonal is represented by x' and coordinate of the curved surface of the microlens in the direction perpendicular to the base is represented by z'. The horizontal axis of FIG. 20 indicates coordinate x' along the diagonal. The coordinate of the center of the rectangle is 0, and the unit of length is millimeter. The vertical axis of FIG. 20 indicates the absolute value of the second derivative of z' with respect to x'. When the absolute value of the second derivative of z' with respect to x' at the x' coordinate of the center of the rectangle is represented by D0, and that at the x' coordinate of the end of the diagonal of the rectangle is represented by D, D0 is 55.719, D is 27.116 and D/D0 is 0.487.

A straight line which is parallel to the diagonal defining coordinate x' and which intersects with the z-axis of the optical system is referred to as the x'-axis of the optical system.

FIG. 21 shows a distribution of luminous intensity of a light beam diffused by the diffusor. The horizontal axis of FIG. 21 indicates angle of a ray of light with respect to the z-axis in a cross section containing the x'-axis and z-axis of the optical system. The unit of angle is degree. The vertical axis of FIG. 21 indicates luminous intensity of a ray of light in the cross section containing the x'-axis and z-axis of the optical system. The unit of luminous intensity is watt/steradian.

The efficiency of the optical system including the light source and the diffusor is 74.2%.

Example 4

Figure 22:
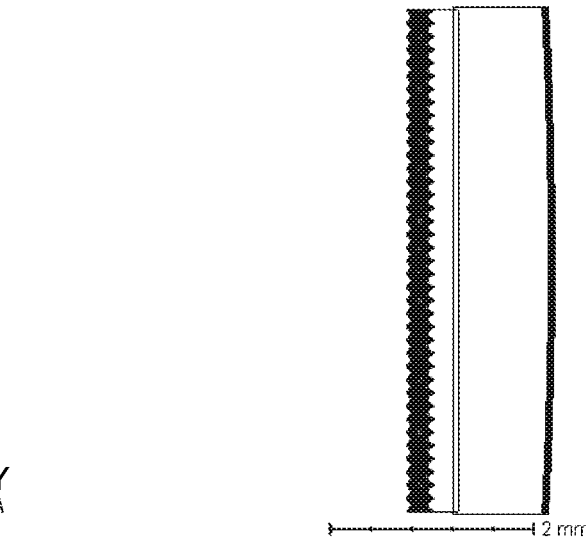
FIG. 22 is a side view (yz plane) of a diffusor of Example 4.

FIG. 22 is a side view (yz plane) of a diffusor of Example 4.

Figure 23:
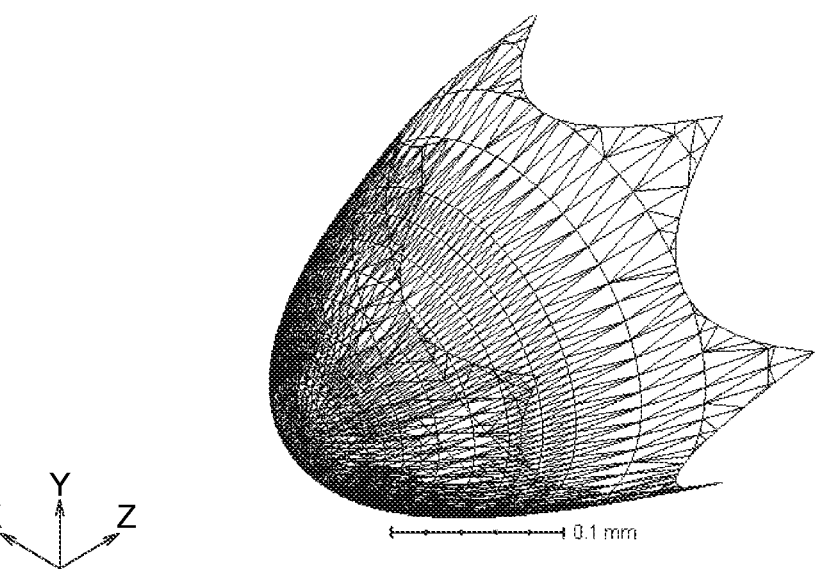
FIG. 23 is a perspective view of a microlens of the diffusor of Example 4.

FIG. 23 is a perspective view of a microlens of the diffusor of Example 4.

Figure 24:
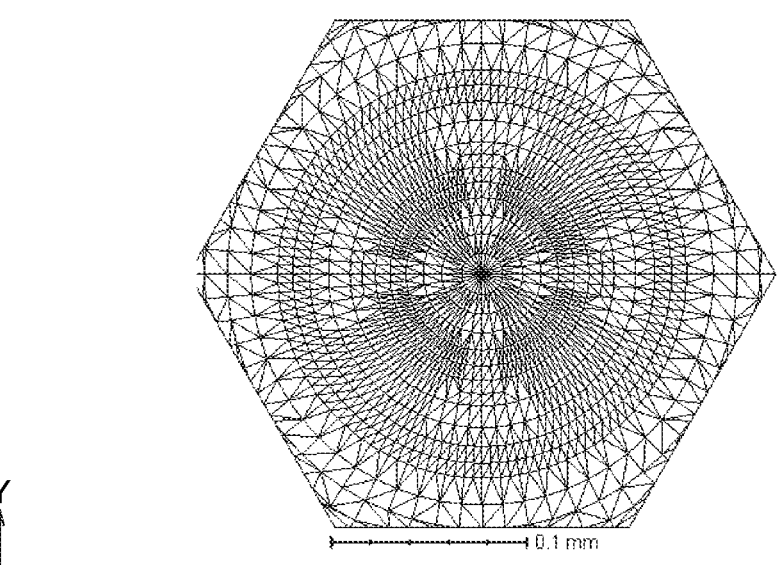
FIG. 24 is a plan view (xy plane) of a microlens of the diffusor of Example 4.

FIG. 24 is a plan view (xy plane) of a microlens of the diffusor of Example 4.

Figure 25:
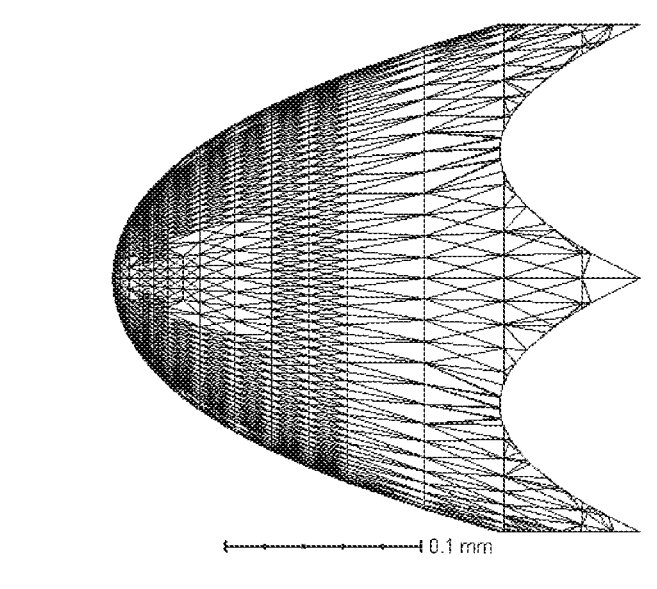
FIG. 25 is a side view (yz plane) of a microlens of the diffusor of Example 4.

FIG. 25 is a side view (yz plane) of a microlens of the diffusor of Example 4.

The shape of the diffusor of Example 4 in a cross section parallel to an xy plane is a square each side of which is 5 millimeters long.

The base of each microlens of Example 4 is regular hexagonal, and regular hexagonal bases are arranged on an xy plane without any gap therebetween.

Figure 52:
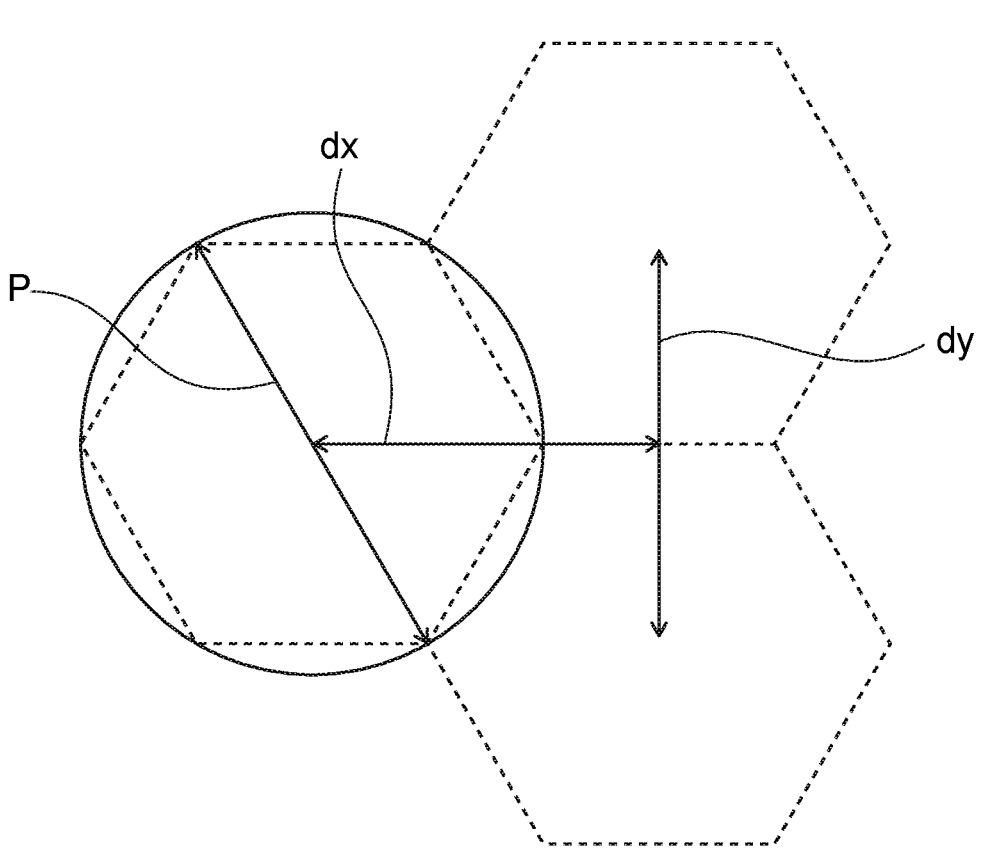
FIG. 52 shows an arrangement of regular hexagonal bases of microlenses of Example 4.

FIG. 52 shows an arrangement of regular hexagonal bases of microlenses of Example 4. In FIG. 52, distance dx in the x-axis direction between the centers of regular hexagons which border each other is 0.225 millimeters, and distance dy in the y-axis direction between the centers of regular hexagons which border each other are 0.260 millimeters. The length P of a diagonal passing through the center of a regular hexagon is 0.3 millimeters.

The numerical data of Expression (1) representing the curved surface of a microlens are as below.

R: 0.056 mm k: −0.956

A2: 0

A4: 8.348E+001

A6: 2.382E+004

A8: −3.014E+006

A10: 2.078E+008

A12: −9.608E+009

A14: 2.518E+011

A16: −2.726E+012

From the data given above, the value of P/(2R) is 2.685.

A reference radius of a circle formed by a line of intersection between the curved surface and the base of a microlens is 0.3/2=0.15 millimeters. The center of the circle is located at the point of intersection of the diagonals of the regular hexagon of the base. Further, a circle the center of which is located at the point of intersection of the diagonals of the regular hexagon of the base and which has a radius of 0.260/2=0.13 millimeters is contained within the base. Accordingly, an area of a circle that has a radius of 86.7% of the reference radius is contained in the base.

The surface farther from the light source of the diffusor is spherical, and the numerical data of Expression (1) representing the surface farther from the light source are as below.

Rexit: −15 mm k: 0

The thickness of the diffusor, that is, the distance in the z-axis direction between the vertex of a microlens and the vertex of the surface farther from the light source is 1.45 millimeters.

The light source surface is rectangular, and the size in the x-axis direction is 0.85 millimeters and that in the y-axis direction is 0.65 millimeters. The distance in the z-axis direction between the light source and the diffusor 2.0 millimeters.

A light source of Example 4 emits a divergent light beam.

Figure 53:
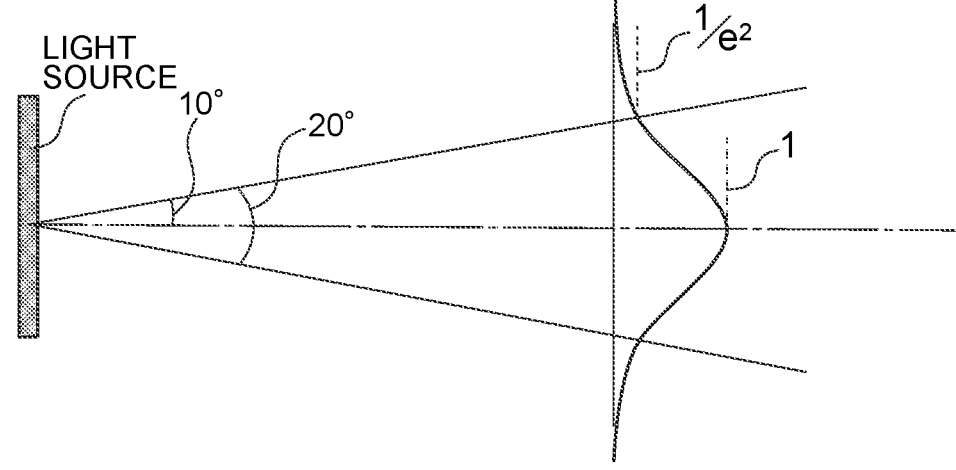
FIG. 53 shows a cross section of a light beam emitted by an emitting element, the cross section containing the central axis of the light beam.
Figure 54:
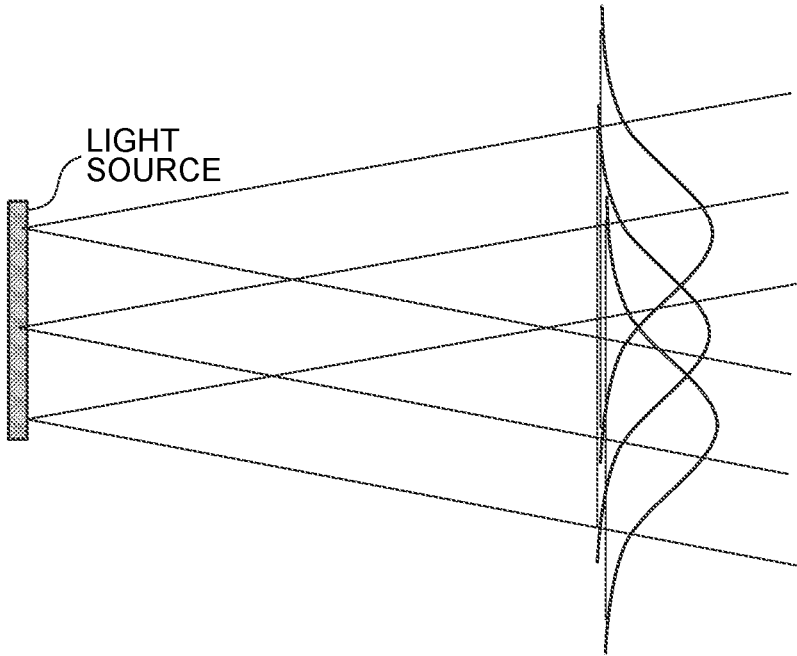
FIG. 54 shows a cross section of light beams emitted by plural emitting elements, the cross section containing the central axis of the light beam.
Figure 55:
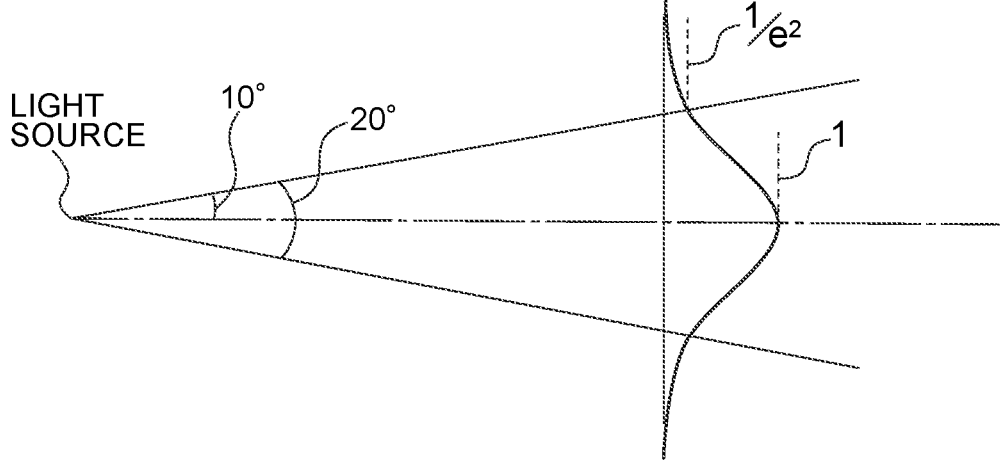
FIG. 55 shows a cross section of a light beam emitted by the light source, the cross section containing the central axis of the light beam when observed at a position far enough away from the light source.

FIGS. 53-55 illustrates the light source of Example 4 that emits a divergent light beam. On the emitting surface of the light source a great number of emitting elements are provided.

FIG. 53 shows a cross section of a light beam emitted by an emitting element, the cross section containing the central axis of the light beam. In the cross section containing the central axis of the light beam emitted by the light source of the present example, a distribution of luminous intensity of the light beam is Gaussian, and provided that the luminous intensity at the center of the light beam is 1, luminous intensity is $$1/e^2$$

when a ray is at the angle of 10 degrees with respect to the axis which passes through the center of the light source and is in the z-axis direction. "e" represents the base of natural logarithms.

FIG. 54 shows a cross section of light beams emitted by the plural emitting elements, the cross section containing the central axes of the light beams.

FIG. 55 shows a cross section of a light beam emitted by the light source, the cross section containing the central axis of the light beam when observed at a position far enough away from the light source.

The power of the light source is 1 watt. The wavelength of light is 850 nanometers, and the refractive index of the diffusor at the above-described wavelength is 1.6296.

Figures 26, 27, 28:
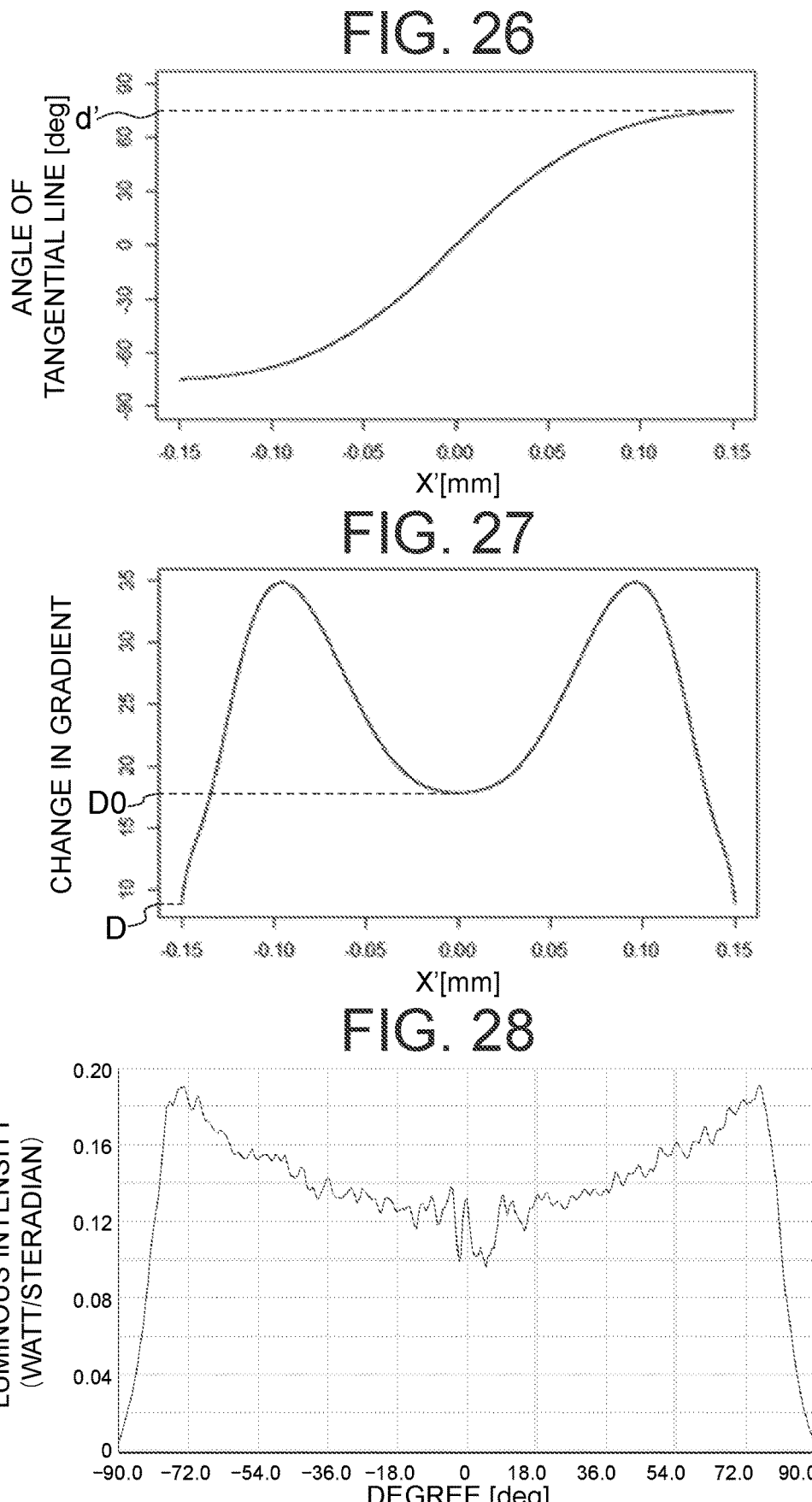
FIG. 26 shows the first derivative of z' with respect to x', where in a cross section which is perpendicular to the base and contains a diagonal of the regular hexagon of the base of a microlens, the diagonal passing through the center of the regular hexagon, coordinate along the diagonal is represented by x' and coordinate of the curved surface of the microlens in the direction perpendicular to the base is represented by z'.
FIG. 27 shows the second derivative of z' with respect to x', where in a cross section which contains a diagonal of the regular hexagon of the base of a microlens, the diagonal passing through the center of the regular hexagon and which is perpendicular to the base, coordinate along the diagonal is represented by x' and coordinate of the curved surface of the microlens in the direction perpendicular to the base is represented by z'.
FIG. 28 shows a distribution of luminous intensity of a light beam diffused by the diffusor.

FIG. 26 shows the first derivative of z' with respect to x', where in a cross section which is perpendicular to the base and contains a diagonal of the regular hexagon of the base of a microlens, the diagonal passing through the center of the regular hexagon, coordinate along the diagonal is represented by x' and coordinate of the curved surface of the microlens in the direction perpendicular to the base is represented by z'. The horizontal axis of FIG. 26 indicates coordinate x' along the diagonal. The coordinate of the center of the regular hexagon is 0, and the unit of length is millimeter. The vertical axis of FIG. 26 indicates angle of tangential line corresponding to the first derivative of z' with respect to x'. The angle of tangential line is an angle (acute angle) of the tangential line on the curved line representing the above-described curved surface with respect to the x'-axis direction in the above-described cross section. Angles measured in the clockwise direction are represented as positive, and angles measured in the counterclockwise direction are represented as negative. The maximum value of the first derivative of z' with respect to x' is 3.691, and the value corresponds to 74.8 degrees in the vertical axis of FIG. 26.

FIG. 27 shows the second derivative of z' with respect to x', where in a cross section which contains a diagonal of the regular hexagon of the base of a microlens, the diagonal passing through the center of the regular hexagon and which is perpendicular to the base, coordinate along the diagonal is represented by x' and coordinate of the curved surface of the microlens in the direction perpendicular to the base is represented by z'. The horizontal axis of FIG. 27 indicates coordinate x' along the diagonal. The coordinate of the center of the regular hexagon is 0, and the unit of length is millimeter. The vertical axis of FIG. 27 indicates the absolute value of the second derivative of z' with respect to x'. When the absolute value of the second derivative of z' with respect to x' at the x' coordinate of the center of the regular hexagon is represented by D0, and that at the x' coordinate of the end of the diagonal of the regular hexagon is represented by D, D0 is 17.900, D is 8.901 and D/D0 is 0.497.

A straight line which is parallel to the diagonal defining coordinate x' and which intersects with the z-axis of the optical system is referred to as the x'-axis of the optical system.

FIG. 28 shows a distribution of luminous intensity of a light beam diffused by the diffusor. The horizontal axis of FIG. 28 indicates angle of a ray of light with respect to the z-axis in a cross section containing the x'-axis and z-axis of the optical system. The unit of angle is degree. The vertical axis of FIG. 28 indicates luminous intensity of a ray of light in the cross section containing the x'-axis and z-axis of the optical system. The unit of luminous intensity is watt/steradian.

The efficiency of the optical system including the light source and the diffusor is 81.8%.

Example 5

Figure 29:
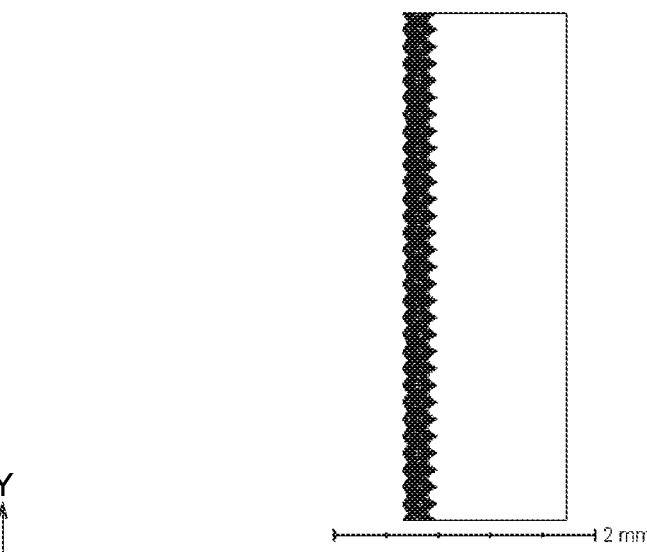
FIG. 29 is a side view (yz plane) of a diffusor of Example 5.

FIG. 29 is a side view (yz plane) of a diffusor of Example 5.

Figure 30:
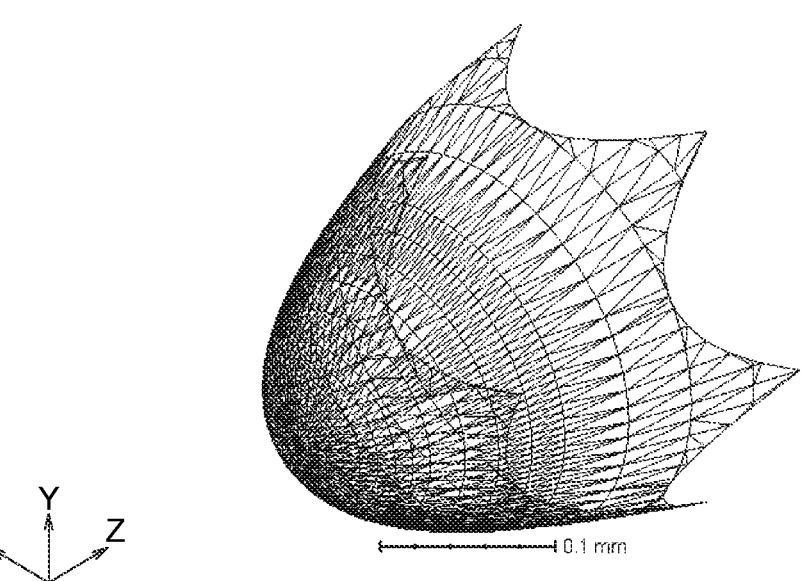
FIG. 30 is a perspective view of a microlens of the diffusor of Example 5.

FIG. 30 is a perspective view of a microlens of the diffusor of Example 5.

Figure 31:
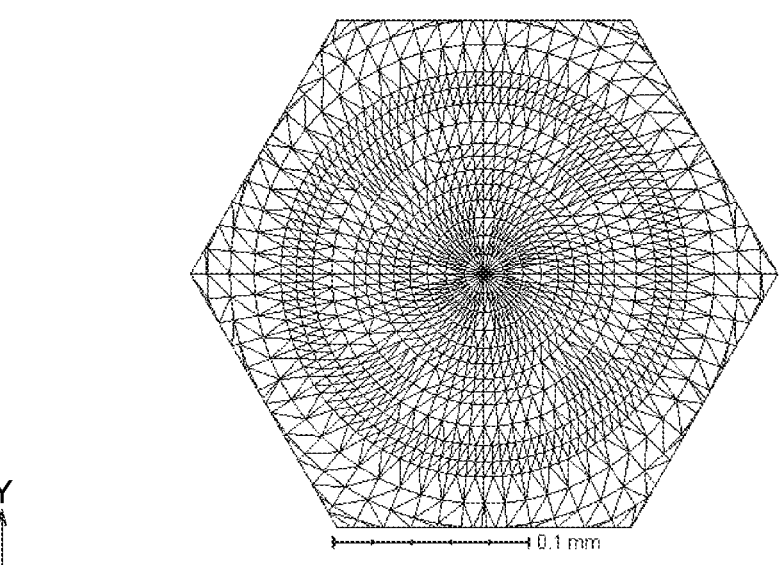
FIG. 31 is a plan view (xy plane) of a microlens of the diffusor of Example 5.

FIG. 31 is a plan view (xy plane) of a microlens of the diffusor of Example 5.

Figure 32:
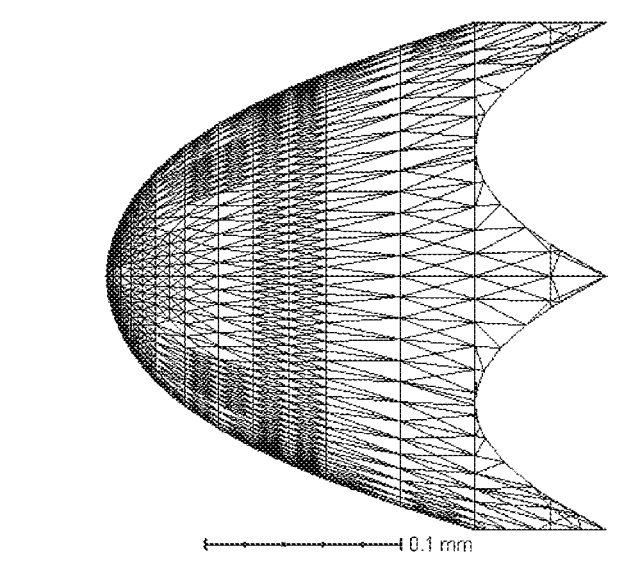
FIG. 32 is a side view (yz plane) of a microlens of the diffusor of Example 5.

FIG. 32 is a side view (yz plane) of a microlens of the diffusor of Example 5.

The shape of the diffusor of Example 5 in a cross section parallel to an xy plane is a square each side of which is 5 millimeters long.

The base of each microlens of Example 5 is regular hexagonal, and regular hexagonal bases are arranged on an xy plane without any gap therebetween.

FIG. 52 shows an arrangement of regular hexagonal bases of microlenses of Example 5. In FIG. 52, distance dx in the x-axis direction between the centers of regular hexagons which border each other is 0.225 millimeters, and distance dy in the y-axis direction between the centers of regular hexagons which border each other is 0.260 millimeters. The length P of a diagonal passing through the center of a regular hexagon is 0.3 millimeters.

The numerical data of Expression (1) representing the curved surface of a microlens are as below.

R: 0.045 m k: −6.134

A2: 0

A4: 1.422+03

A6: −1.573E+05

A8: 1.358E+07

A10: −7.198+08
A12: 1.994+10
A14: −2.216+11

From the data given above, the value of P/(2R) is 3.333.

The surface farther from the light source of the diffusor is flat, and the numerical data of Expression (1) representing the surface farther from the light source are as below.

Rexit: Infinity
k: 0

The thickness of the diffusor, that is, the distance in the z-axis direction between the vertex of a microlens and the vertex of the surface farther from the light source is 1.25 millimeters.

The light source surface is square, and the size in the x-axis direction and that in the y-axis direction are 1.0 millimeter. The distance in the z-axis direction between the light source and the diffusor 2.0 millimeters.

A light source of the present example also emits a divergent light beam like the light source of Example 4. In the cross section containing the central axis of the light beam emitted by the light source of the present example, a distribution of luminous intensity of the light beam is Gaussian, and provided that the luminous intensity at the center of the light beam is 1, luminous intensity is ½ when a ray is at the angle of 10 degrees with respect to the axis which passes through the center of the light source and is in the z-axis direction.

The power of the light source is 1 watt. The wavelength of light is 850 nanometers, and the refractive index of the diffusor at the above-described wavelength is 1.6296.

Figures 33, 34, 35:
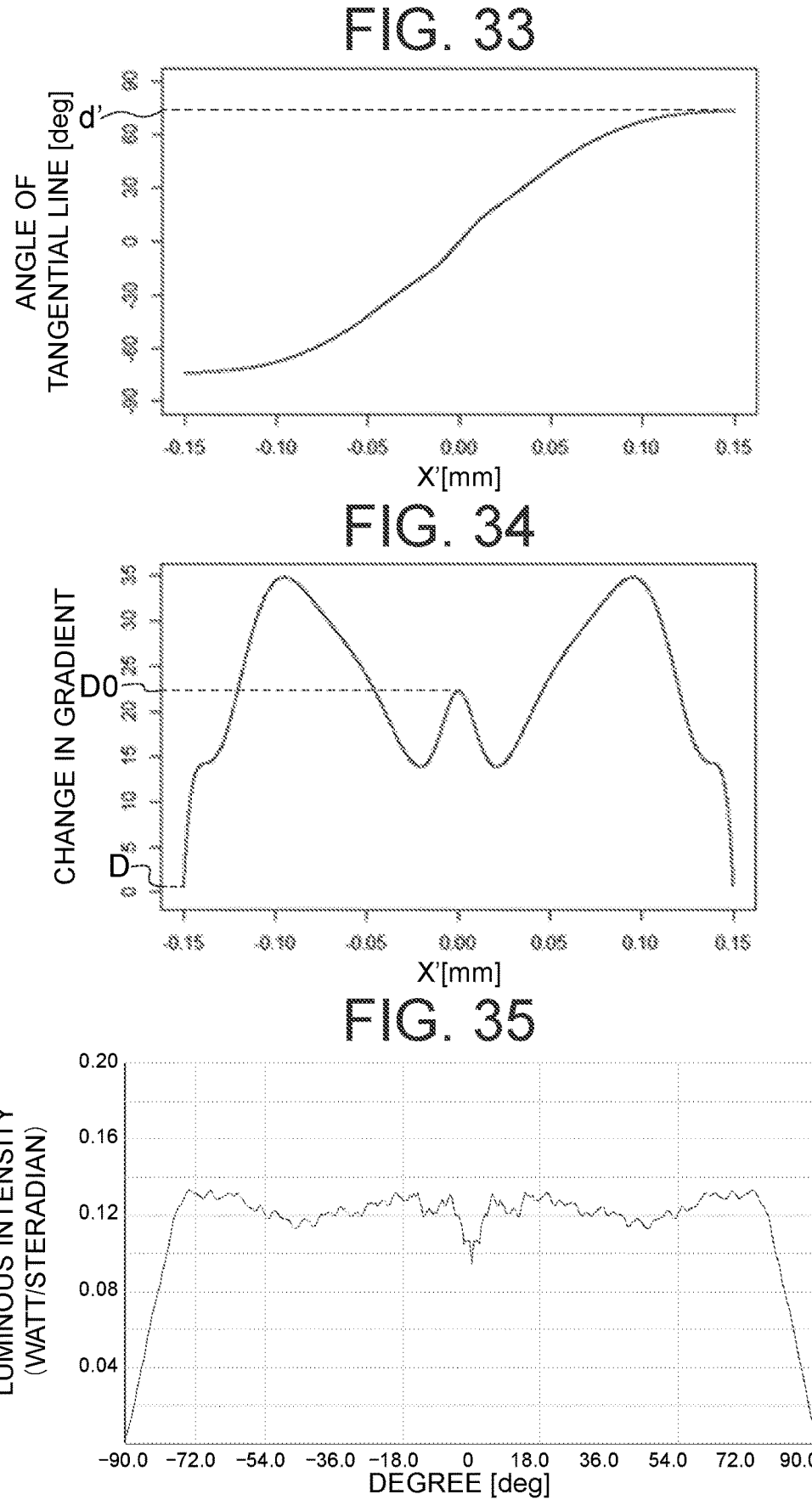
FIG. 33 shows the first derivative of z' with respect to x', where in a cross section which is perpendicular to the base and contains a diagonal of the regular hexagon of the base of a microlens, the diagonal passing through the center of the regular hexagon, coordinate along the diagonal is represented by x' and coordinate of the curved surface of the microlens in the direction perpendicular to the base is represented by z'.
FIG. 34 shows the second derivative of z' with respect to x', where in a cross section which contains a diagonal of the regular hexagon of the base of a microlens, the diagonal passing through the center of the regular hexagon and which is perpendicular to the base, coordinate along the diagonal is represented by x' and coordinate of the curved surface of the microlens in the direction perpendicular to the base is represented by z'.
FIG. 35 shows a distribution of luminous intensity of a light beam diffused by the diffusor.

FIG. 33 shows the first derivative of z' with respect to x', where in a cross section which is perpendicular to the base and contains a diagonal of the regular hexagon of the base of a microlens, the diagonal passing through the center of the regular hexagon, coordinate along the diagonal is represented by x' and coordinate of the curved surface of the microlens in the direction perpendicular to the base is represented by z'. The horizontal axis of FIG. 33 indicates coordinate x' along the diagonal. The coordinate of the center of the regular hexagon is 0, and the unit of length is millimeter. The vertical axis of FIG. 33 indicates angle of tangential line corresponding to the first derivative of z' with respect to x'. The angle of tangential line is an angle (acute angle) of the tangential line on the curved line representing the above-described curved surface with respect to the x'-axis direction in the above-described cross section. Angles measured in the clockwise direction are represented as positive, and angles measured in the counterclockwise direction are represented as negative. The maximum value of the first derivative of z' with respect to x' is 3.464, and the value corresponds to 73.9 degrees in the vertical axis of FIG. 33.

FIG. 34 shows the second derivative of z' with respect to x', where in a cross section which contains a diagonal of the regular hexagon of the base of a microlens, the diagonal passing through the center of the regular hexagon and which is perpendicular to the base, coordinate along the diagonal is represented by x' and coordinate of the curved surface of the microlens in the direction perpendicular to the base is represented by z'. The horizontal axis of FIG. 34 indicates coordinate x' along the diagonal. The coordinate of the center of the regular hexagon is 0, and the unit of length is millimeter. The vertical axis of FIG. 34 indicates the absolute value of the second derivative of z' with respect to x'. When the absolute value of the second derivative of z' with respect to x' at the x' coordinate of the center of the regular hexagon is represented by D0, and that at the x' coordinate of the end of the diagonal of the regular hexagon is represented by D, D0 is 22.222, D is 0.505 and D/D0 is 0.023.

A straight line which is parallel to the diagonal defining coordinate x' and which intersects with the z-axis of the optical system is referred to as the x'-axis of the optical system.

FIG. 35 shows a distribution of luminous intensity of a light beam diffused by the diffusor. The horizontal axis of FIG. 35 indicates angle of a ray of light with respect to the z-axis in a cross section containing the x'-axis and z-axis of the optical system. The unit of angle is degree. The vertical axis of FIG. 35 indicates luminous intensity of a ray of light in the cross section containing the x'-axis and z-axis of the optical system. The unit of luminous intensity is watt/steradian.

The efficiency of the optical system including the light source and the diffusor is 67.8%.

Example 6

Figure 36:
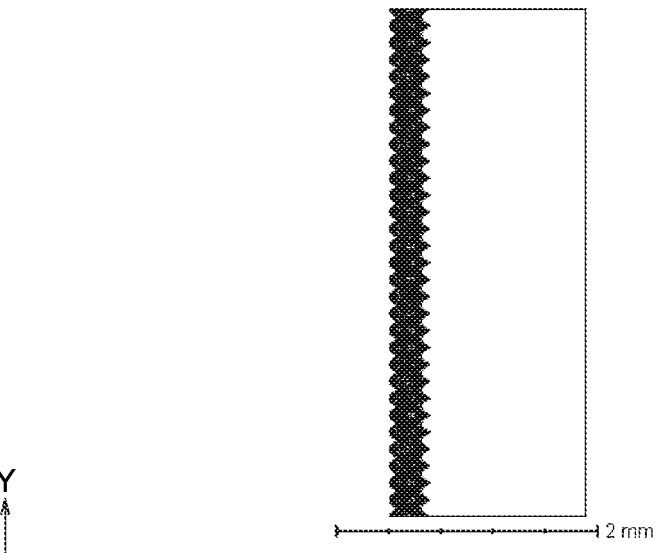
FIG. 36 is a side view (yz plane) of a diffusor of Example 6.

FIG. 36 is a side view (yz plane) of a diffusor of Example 6.

Figure 37:
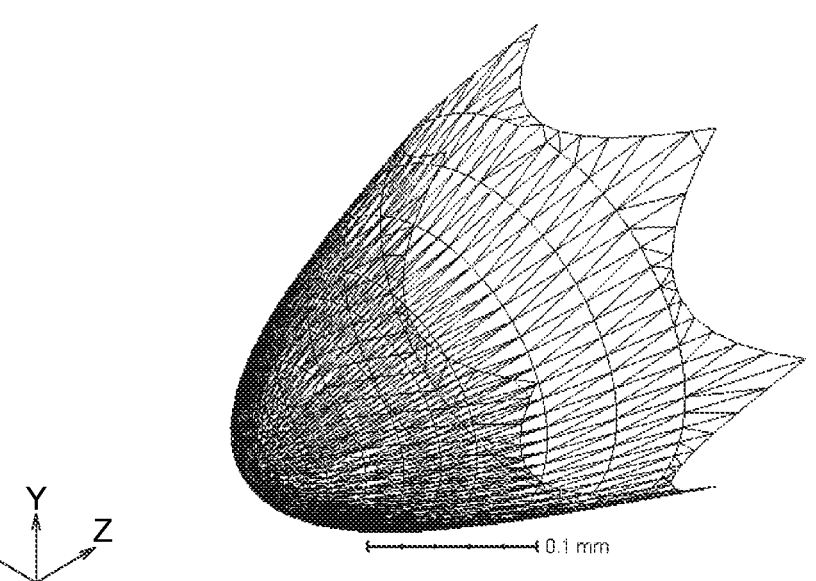
FIG. 37 is a perspective view of a microlens of the diffusor of Example 6.

FIG. 37 is a perspective view of a microlens of the diffusor of Example 6.

Figure 38:
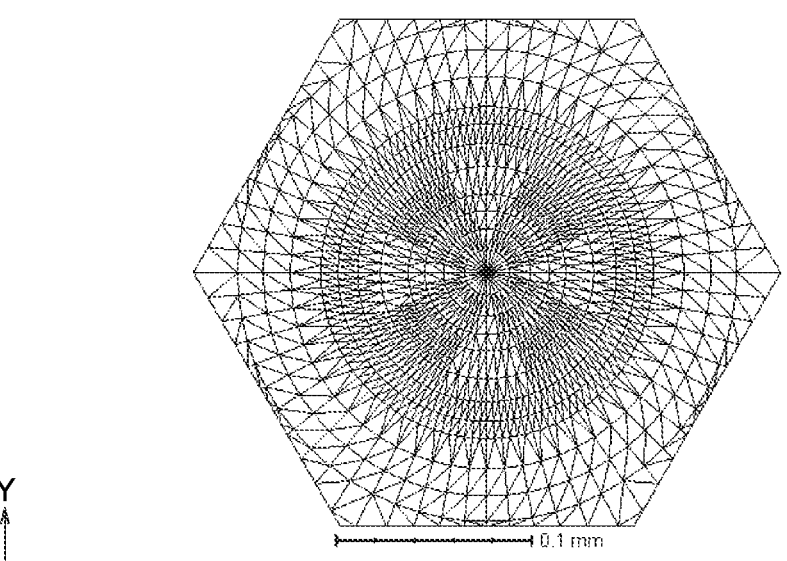
FIG. 38 is a plan view (xy plane) of a microlens of the diffusor of Example 6.

FIG. 38 is a plan view (xy plane) of a microlens of the diffusor of Example 6.

Figure 39:
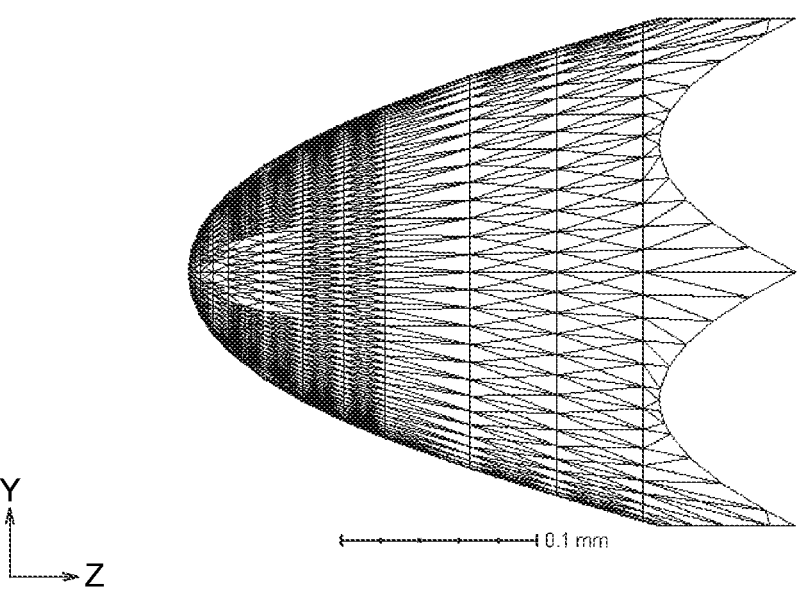
FIG. 39 is a side view (yz plane) of a microlens of the diffusor of Example 6.

FIG. 39 is a side view (yz plane) of a microlens of the diffusor of Example 6.

The shape of the diffusor of Example 6 in a cross section parallel to an xy plane is a square each side of which is 5 millimeters long.

The base of each microlens of Example 6 is regular hexagonal, and regular hexagonal bases are arranged on an xy plane without any gap therebetween.

FIG. 52 shows an arrangement of regular hexagonal bases of microlenses of Example 6. In FIG. 52, distance dx in the x-axis direction between the centers of regular hexagons which border each other is 0.225 millimeters, and distance dy in the y-axis direction between the centers of regular hexagons which border each other is 0.260 millimeters. The length P of a diagonal passing through the center of a regular hexagon is 0.3 millimeters.

The numerical data of Expression (1) representing the curved surface of a microlens are as below.

R: 0.042 m
k: −0.956
A2: 0
A4: 3.517E+02
A6: −2.282E+04
A8: 2.737E+05

From the data given above, the value of P/(2R) is 3.571.

The surface farther from the light source of the diffusor is flat, and the numerical data of Expression (1) representing the surface farther from the light source are as below.

Rexit: Infinity
k: 0

The thickness of the diffusor, that is, the distance in the z-axis direction between the vertex of a microlens and the vertex of the surface farther from the light source is 1.50 millimeters.

The light source surface is square, and the size in the x-axis direction and that in the y-axis direction are 1.0 millimeter. The distance in the z-axis direction between the light source and the diffusor 2.0 millimeters. In the present example, the diffusor is illuminated with a light beam having the same sizes with those of the light source.

Luminous intensity in the light beam is uniform. The power of the light source is 1 watt. The wavelength of light is 850 nanometers, and the refractive index of the diffusor at the above-described wavelength is 1.6296.

Figures 40, 41, 42:
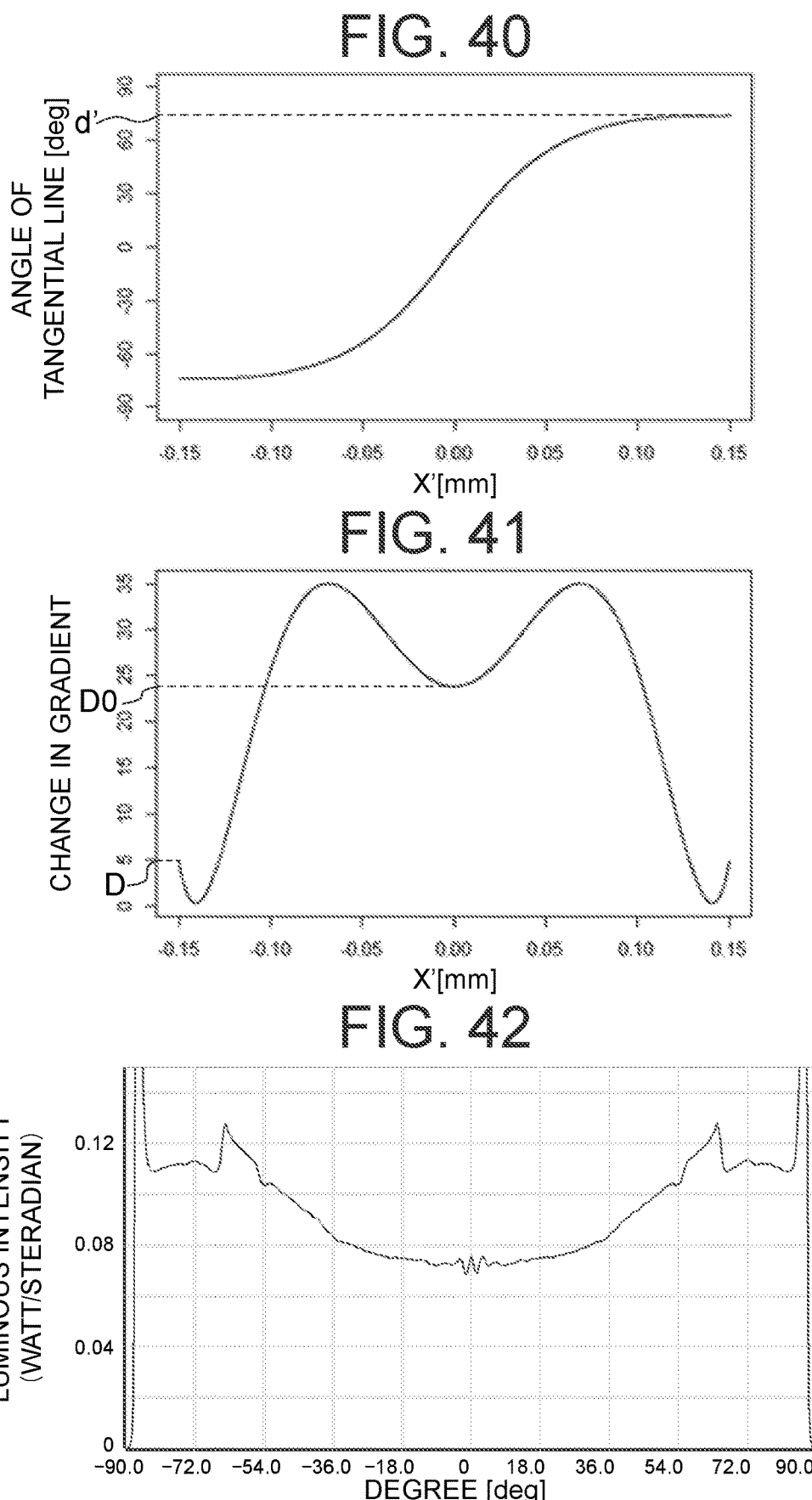
FIG. 40 shows the first derivative of z' with respect to x', where in a cross section which is perpendicular to the base and contains a diagonal of the regular hexagon of the base of a microlens, the diagonal passing through the center of the regular hexagon, coordinate along the diagonal is represented by x' and coordinate of the curved surface of the microlens in the direction perpendicular to the base is represented by z'.
FIG. 41 shows the second derivative of z' with respect to x', where in a cross section which contains a diagonal of the regular hexagon of the base of a microlens, the diagonal passing through the center of the regular hexagon and which is perpendicular to the base, coordinate along the diagonal is represented by x' and coordinate of the curved surface of the microlens in the direction perpendicular to the base is represented by z'.
FIG. 42 shows a distribution of luminous intensity of a light beam diffused by the diffusor.

FIG. 40 shows the first derivative of z' with respect to x', where in a cross section which is perpendicular to the base and contains a diagonal of the regular hexagon of the base of a microlens, the diagonal passing through the center of the regular hexagon, coordinate along the diagonal is represented by x' and coordinate of the curved surface of the microlens in the direction perpendicular to the base is represented by z'. The horizontal axis of FIG. 40 indicates coordinate x' along the diagonal. The coordinate of the center of the regular hexagon is 0, and the unit of length is millimeter. The vertical axis of FIG. 40 indicates angle of tangential line corresponding to the first derivative of z' with respect to x'. The angle of tangential line is an angle (acute angle) of the tangential line on the curved line representing the above-described curved surface with respect to the x'-axis direction in the above-described cross section. Angles measured in the clockwise direction are represented as positive, and angles measured in the counterclockwise direction are represented as negative. The maximum value of the first derivative of z' with respect to x' is 3.483, and the value corresponds to 74.0 degrees in the vertical axis of FIG. 40.

FIG. 41 shows the second derivative of z' with respect to x', where in a cross section which contains a diagonal of the regular hexagon of the base of a microlens, the diagonal passing through the center of the regular hexagon and which is perpendicular to the base, coordinate along the diagonal is represented by x' and coordinate of the curved surface of the microlens in the direction perpendicular to the base is represented by z'. The horizontal axis of FIG. 41 indicates coordinate x' along the diagonal. The coordinate of the center of the regular hexagon is 0, and the unit of length is millimeter. The vertical axis of FIG. 41 indicates the absolute value of the second derivative of z' with respect to x'. When the absolute value of the second derivative of z' with respect to x' at the x' coordinate of the center of the regular hexagon is represented by D0, and that at the x' coordinate of the end of the diagonal of the regular hexagon is represented by D, D0 is 23.810, D is 4.886 and D/D0 is 0.205.

A straight line which is parallel to the diagonal defining coordinate x' and which intersects with the z-axis of the optical system is referred to as the x'-axis of the optical system.

FIG. 42 shows a distribution of luminous intensity of a light beam diffused by the diffusor. The horizontal axis of FIG. 42 indicates angle of a ray of light with respect to the z-axis in a cross section containing the x'-axis and z-axis of the optical system. The unit of angle is degree. The vertical axis of FIG. 42 indicates luminous intensity of a ray of light in the cross section containing the x'-axis and z-axis of the optical system. The unit of luminous intensity is watt/steradian.

The efficiency of the optical system including the light source and the diffusor is 63.1%.

Example 7

Figure 43:
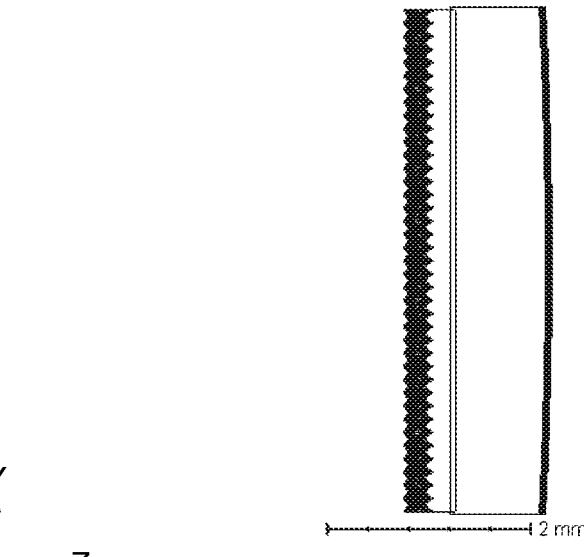
FIG. 43 is a side view (yz plane) of a diffusor of Example 7.

FIG. 43 is a side view (yz plane) of a diffusor of Example 7.

Figure 44:
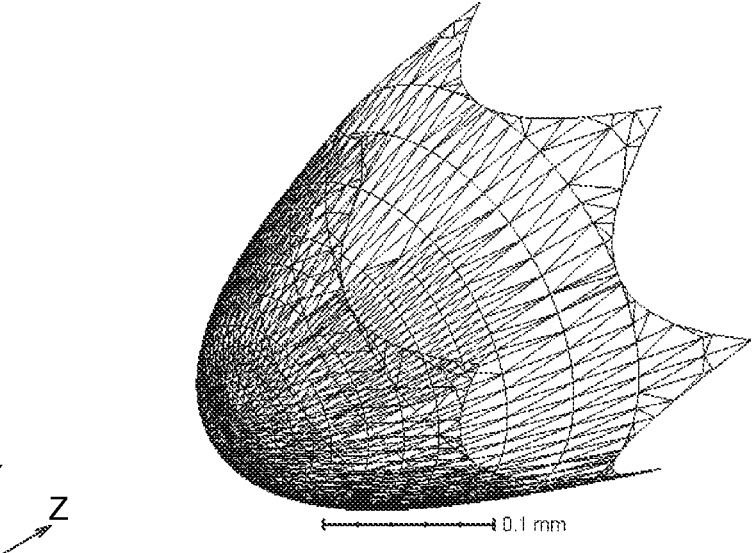
FIG. 44 is a perspective view of a microlens of the diffusor of Example 7.
Figure 44:
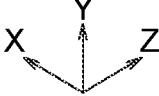

FIG. 44 is a perspective view of a microlens of the diffusor of Example 7.

Figure 45:
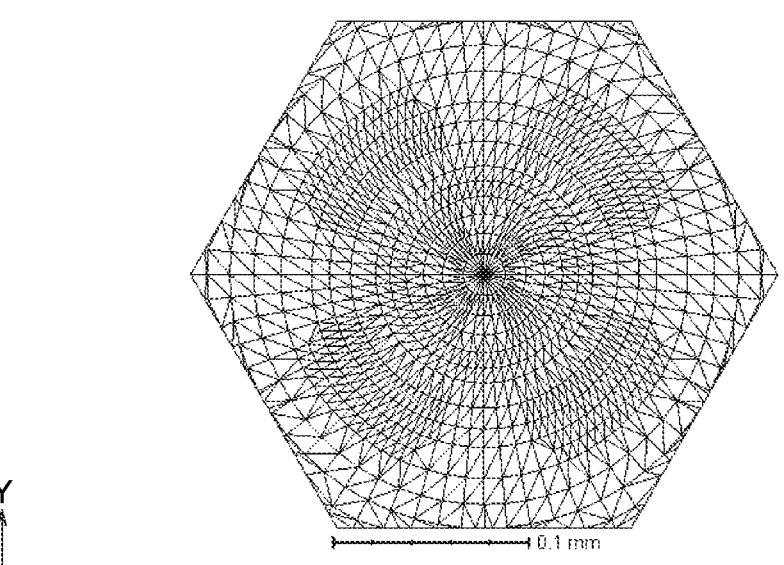
FIG. 45 is a plan view (xy plane) of a microlens of the diffusor of Example 7.

FIG. 45 is a plan view (xy plane) of a microlens of the diffusor of Example 7.

Figure 46:
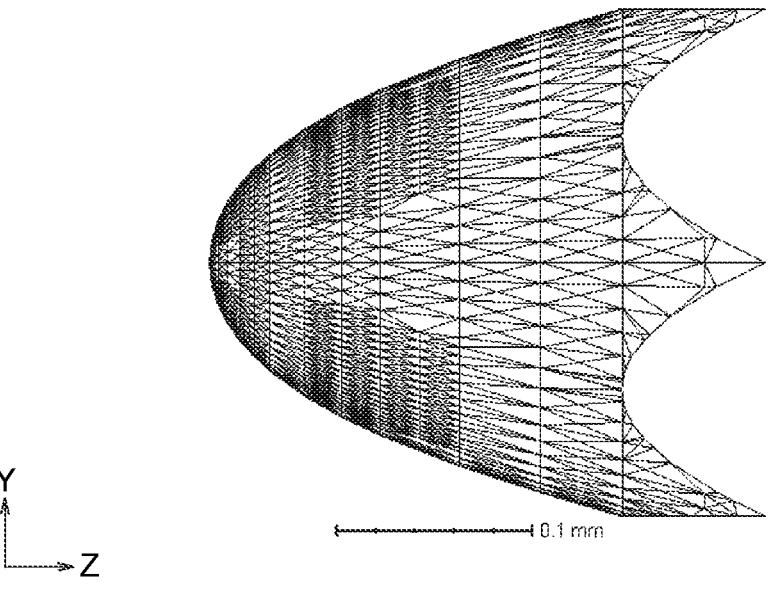
FIG. 46 is a side view (yz plane) of a microlens of the diffusor of Example 7.

FIG. 46 is a side view (yz plane) of a microlens of the diffusor of Example 7.

The shape of the diffusor of Example 7 in a cross section parallel to an xy plane is a square each side of which is 5 millimeters long.

The base of each microlens of Example 7 is regular hexagonal, and regular hexagonal bases are arranged on an xy plane without any gap therebetween.

FIG. 52 shows an arrangement of regular hexagonal bases of microlenses of Example 7. In FIG. 52, distance dx in the x-axis direction between the centers of regular hexagons which border each other is 0.225 millimeters, and distance dy in the y-axis direction between the centers of regular hexagons which border each other is 0.260 millimeters. The length P of a diagonal passing through the center of a regular hexagon is 0.3 millimeters.

The numerical data of Expression (1) representing the curved surface of a microlens are as below.

R: 5.384E-02 mm
k: −0.963
A2: 0
A4: 1.881E+02
A6: 7.849E+03
A8: −8.096E+05
A10: 1.388E+07

From the data given above, the value of P/(2R) is 3.686.

The surface farther from the light source of the diffusor is spherical, and the numerical data of Expression (1) representing the surface farther from the light source are as below.

Rexit: −15 mm
k: 0

The thickness of the diffusor, that is, the distance in the z-axis direction between the vertex of a microlens and the vertex of the surface farther from the light source is 1.45 millimeters.

The light source surface is rectangular, and the size in the x-axis direction is 0.85 millimeters and that in the y-axis direction is 0.65 millimeters. The distance in the z-axis direction between the light source and the diffusor 2.0 millimeters.

A light source of the present example also emits a divergent light beam like the light source of Example 4. In the cross section containing the central axis of the light beam emitted by the light source of the present example, a distribution of luminous intensity of the light beam is Gaussian, and provided that the luminous intensity at the center of the light beam is 1, luminous intensity is $$1/e^2$$

when a ray is at the angle of 10 degrees with respect to the axis which passes through the center of the light source and is in the z-axis direction. "e" represents the base of natural logarithms.

The power of the light source is 1 watt. The wavelength of light is 850 nanometers, and the refractive index of the diffusor at the above-described wavelength is 1.6296.

Figures 47, 48, 49:
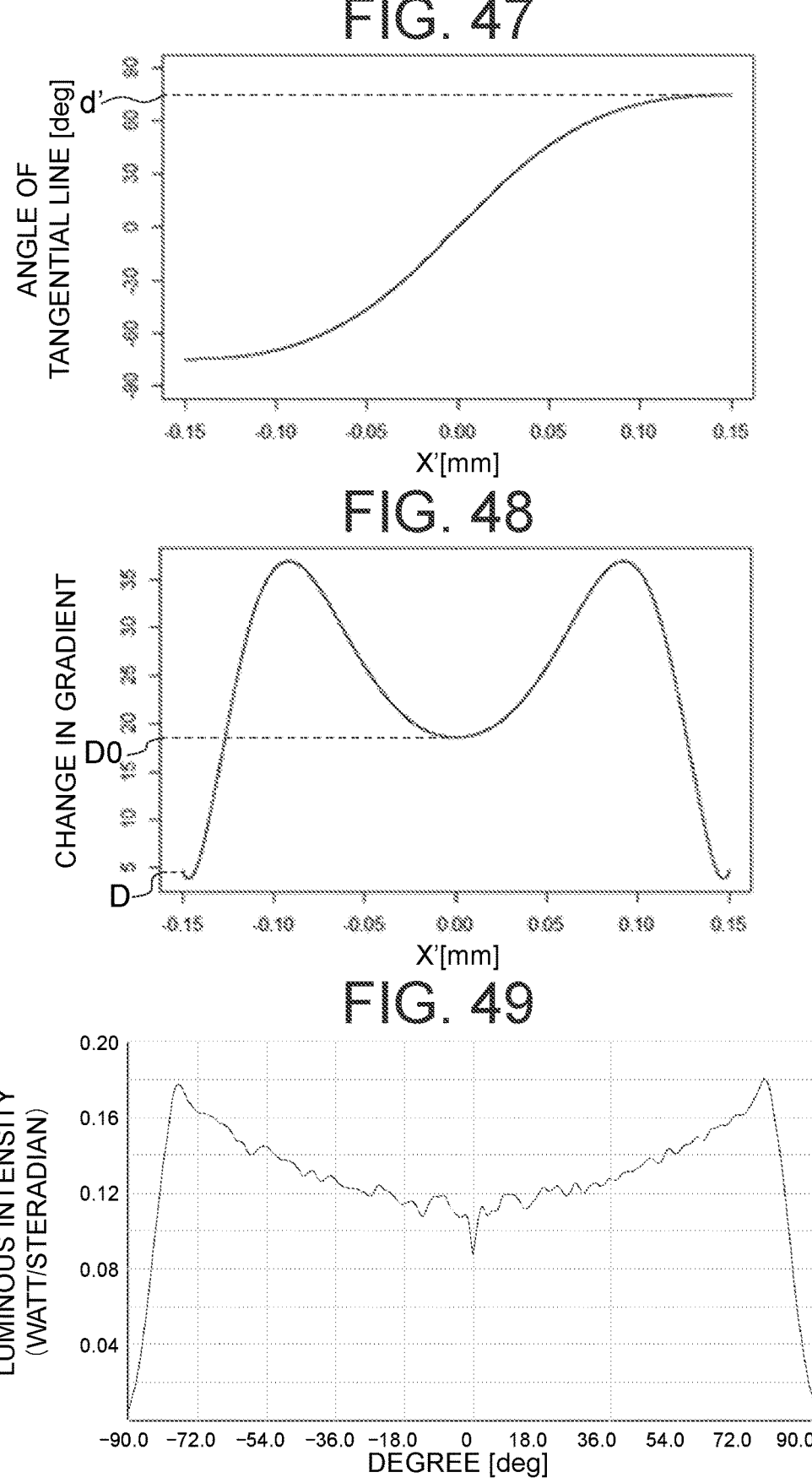
FIG. 47 shows the first derivative of z' with respect to x', where in a cross section which is perpendicular to the base and contains a diagonal of the regular hexagon of the base of a microlens, the diagonal passing through the center of the regular hexagon, coordinate along the diagonal is represented by x' and coordinate of the curved surface of the microlens in the direction perpendicular to the base is represented by z'.
FIG. 48 shows the second derivative of z' with respect to x', where in a cross section which contains a diagonal of the regular hexagon of the base of a microlens, the diagonal passing through the center of the regular hexagon and which is perpendicular to the base, coordinate along the diagonal is represented by x' and coordinate of the curved surface of the microlens in the direction perpendicular to the base is represented by z'.
FIG. 49 shows a distribution of luminous intensity of a light beam diffused by the diffusor.

FIG. 47 shows the first derivative of z' with respect to x', where in a cross section which is perpendicular to the base and contains a diagonal of the regular hexagon of the base of a microlens, the diagonal passing through the center of the regular hexagon, coordinate along the diagonal is represented by x' and coordinate of the curved surface of the microlens in the direction perpendicular to the base is represented by z'. The horizontal axis of FIG. 47 indicates coordinate x' along the diagonal. The coordinate of the center of the regular hexagon is 0, and the unit of length is millimeter. The vertical axis of FIG. 47 indicates angle of tangential line corresponding to the first derivative of z' with respect to x'. The angle of tangential line is an angle (acute angle) of the tangential line on the curved line representing the above-described curved surface with respect to the x'-axis direction in the above-described cross section. Angles measured in the clockwise direction are represented as positive, and angles measured in the counterclockwise direction are represented as negative. The maximum value of the first derivative of z' with respect to x' is 3.686, and the value corresponds to 74.8 degrees in the vertical axis of FIG. 47.

FIG. 48 shows the second derivative of z' with respect to x', where in a cross section which contains a diagonal of the regular hexagon of the base of a microlens, the diagonal passing through the center of the regular hexagon and which is perpendicular to the base, coordinate along the diagonal is represented by x' and coordinate of the curved surface of the microlens in the direction perpendicular to the base is represented by z'. The horizontal axis of FIG. 48 indicates coordinate x' along the diagonal. The coordinate of the center of the regular hexagon 0, and the unit of length is millimeter. The vertical axis of FIG. 48 indicates the absolute value of the second derivative of z' with respect to x'. When the absolute value of the second derivative of z' with respect to x' at the x' coordinate of the center of the regular hexagon is represented by D0, and that at the x' coordinate of the end of the diagonal of the regular hexagon is represented by D, D0 is 18.573, D is 4.638 and D/D0 is 0.250.

A straight line which is parallel to the diagonal defining coordinate x' and which intersects with the z-axis of the optical system is referred to as the x'-axis of the optical system.

FIG. 49 shows a distribution of luminous intensity of a light beam diffused by the diffusor. The horizontal axis of FIG. 49 indicates angle of a ray of light with respect to the z-axis in a cross section containing the x'-axis and z-axis of the optical system. The unit of angle is degree. The vertical axis of FIG. 49 indicates luminous intensity of a ray of light in the cross section containing the x'-axis and z-axis of the optical system. The unit of luminous intensity is watt/steradian.

The efficiency of the optical system including the light source and the diffusor is 78.6%.

Table 1 shows features of the curved surface of each microlens and the surface of the diffusor farther from the light source of Examples 1-7.

TABLE 1

|  | d | D/D0 | P/(2R) | \|Rexit/R\| |
|---|---|---|---|---|
| Example 1 | 3.686 | 0.250 | 2.786 | 836 |
| Example 2 | 3.491 | 0.967 | 2.364 | 836 |
| Example 3 | 3.615 | 0.487 | 2.535 | 836 |
| Example 4 | 3.691 | 0.497 | 2.685 | 893 |
| Example 5 | 3.464 | 0.023 | 3.333 | Infinity |
| Example 6 | 3.483 | 0.205 | 3.571 | Infinity |
| Example 7 | 3.686 | 0.250 | 2.786 | 929 |

Table 2 shows features of optical systems each of which includes one of the diffusors of Examples 1-7.

TABLE 2

|  | Angle of divergence of beam of light source | Distance (mm) | Angle of diffusion (FWHM, degree) | Efficiency (%) |
|---|---|---|---|---|
| Example 1 | 0 degree (collimated light) | 1.0 | 165 | 73.2 |
| Example 2 | 0 degree (collimated light) | 1.0 | 150 | 78.8 |
| Example 3 | 0 degree (collimated light) | 1.0 | 155 | 74.2 |
| Example 4 | 20 degrees (1/e2, Full width) | 2.0 | 165 | 81.8 |
| Example 5 | 20 degrees (FWHM) | 2.0 | 170 | 67.8 |
| Example 6 | 0 degree (collimated light) | 2.0 | 175 | 63.1 |
| Example 7 | 20 degrees (1/e2, Full width) | 2.0 | 175 | 78.6 |

According to Tables 1 and 2, each microlens of all examples satisfies the conditions that d is 2 or greater and D/D0<1, and the angle of diffusion of FWHM of each optical system including one of the diffusors of the examples is greater than 140 degrees. Each microlens of Examples 1 and 3-7 satisfies the conditions that d is 2 or greater and D/D0<0.5, and the angle of diffusion of FWHM of each optical system including one of the diffusors of the examples is greater than 150 degrees. Each microlens of Examples 1 and 5-7 satisfies the conditions that d is 2 or greater and D/D0<0.3, and the angle of diffusion of FWHM of each optical system including one of the diffusors of the examples is greater than 160 degrees.

According to Tables 1 and 2, the efficiency of the optical system of each example is 60% or greater. The efficiency of the optical system of Examples 1~4 and 7 is 70% or greater. The efficiency of the optical system of Examples 2, 4 and 7 is 75% or greater.

What is claimed is:

1. A diffusor provided with a microlens array including microlenses configured in such a way that bases of the microlenses are placed on a plane, wherein a curved surface of each microlens is continuous and smooth except at the boundary and in each microlens $$D/D0<1$$

and $$d \geq 2$$

are satisfied, where there is a cross section of the diffusor, the cross section includes a straight line that is determined to pass through the projection point onto the plane of the vertex of the microlens, and there is a distance between two points of intersection of the straight line and the periphery of the base of the microlens, coordinate along the straight line is represented by x', coordinate of the curved surface of the microlens in the direction perpendicular to the plane is represented by z', the maximum value of the first derivative of z' with respect to x' is represented by d, the absolute value of the second derivative of z' with respect to x' at x' coordinate of the projection point is represented by D0, and the absolute value at x' coordinate of any of the two points of the intersection is represented by is D, and wherein the curved surface is aspherical and axially symmetric around the axis that passes through the projection point and is perpendicular to the plane.

2. The diffusor according to claim 1, wherein the microlenses are arranged in such a way that bases of the microlenses are placed on the plane without any gap therebetween, each base having a congruent and quadrilateral or regular hexagonal shape.

3. The diffusor according to claim 1, wherein in each microlens $$D/D0<0.5$$

is satisfied.

4. The diffusor according to claim 1, wherein in each microlens $$D/D0<0.3$$

is satisfied.

5. The diffusor according to claim 1, wherein in each microlens $$d\geq2.5$$

is satisfied.

6. The diffusor according to claim 1, wherein in each microlens $$d\geq3$$

is satisfied.

7. The diffusor according to claim 2, wherein in each microlens $$1<\frac{P}{2\cdot R}<5.7$$

is satisfied, where a length of a diagonal passing through the center of the quadrilateral or regular hexagonal base is represented by P and a radius of curvature of the curved surface at the vertex is R.

8. A diffusor provided with a microlens array including microlenses arranged in such a way that bases of the microlenses are placed on a plane, wherein a curved surface of each microlens is continuous and smooth except at the boundary and in each microlens $$D/D0<1$$

and $$d\geq2$$

are satisfied, where there is a cross section of the diffusor, the cross section includes a straight line that is determined to pass through the projection point onto the plane of the vertex of the microlens, and there is a distance between two points of intersection of the straight line and the periphery of the base of the microlens, coordinate along the straight line is represented by x', coordinate of the curved surface of the microlens in the direction perpendicular to the plane is represented by z', the maximum value of the first derivative of z' with respect to x' is represented by d, the absolute value of the second derivative of z' with respect to x' at x' coordinate of the projection point is represented by D0 and the absolute value at x' coordinate of any of the two points of the intersection is represented by is D, and wherein a surface on a side opposite from the surface provided with the microlenses is a convex surface and the absolute value of radius of curvature of the convex surface is 100 times as great as R or greater where the absolute value of radius of curvature of the curved surface at the vertex is represented by R.

9. An optical system including the diffusor according to claim 1 and a light source.

10. The optical system according to claim 9, wherein the microlens array is located in such a way that the microlens array faces the light source.

11. The optical system according to claim 9, wherein the light source emits a divergent light beam.

12. A method for producing a diffusor provided with a microlens array including microlenses configured in such a way that bases of the microlenses are placed on a plane, wherein a curved surface of each microlens is continuous and smooth except at the boundary, the surface of the diffusor opposite from the surface provided with the microlens array being a flat surface parallel to the plane or a convex surface, wherein d is determined in the range of $$d\geq2$$

and D/D0 is adjusted and determined in the range of $$D/D0<1$$

in such a way that a diffused light beam with FWHM of greater than 140 degrees can be realized when the surface provided with the microlens array is illuminated with a collimated light beam in a z-axis direction, where the z-axis is defined to be orthogonal to the plane and there is a cross section of the diffusor, the cross section includes a straight line that is determined to pass through the projection point onto the plane of the vertex of the microlens, and there is a distance between two points of intersection of the straight line and the periphery of the base of the microlens, coordinate along the straight line is represented by x', coordinate of the curved surface of the microlens in the direction perpendicular to the plane is represented by z', the maximum value of the first derivative of z' with respect to x' is represented by d, the absolute value of the second derivative of z' with respect to x' at x' coordinate of the projection point is D0, and the absolute value at x' coordinate of any of the two points of the intersection is D.

13. The method for producing a diffusor according to claim 12, wherein D/D0 is adjusted and determined in the range of $$D/D0<0.5$$

in such a way that a diffused light beam with FWHM of greater than 150 degrees can be realized when the surface provided with the microlens array is illuminated with a collimated light beam in the z-axis direction.

14. The method for producing a diffusor according to claim 12, wherein D/D0 is adjusted and determined in the range of $$D/D0<0.3$$

in such a way that a diffused light beam with FWHM of greater than 160 degrees can be realized when the surface provided with the microlens array is illuminated with a collimated light beam in the z-axis direction.

*     *     *     *     *